(12) United States Patent
Kojima

(10) Patent No.: US 7,640,314 B2
(45) Date of Patent: Dec. 29, 2009

(54) NETWORK SYSTEM, DEVICE AND PROGRAM

(75) Inventor: Atsushi Kojima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 710 days.

(21) Appl. No.: 11/359,406

(22) Filed: Feb. 23, 2006

(65) Prior Publication Data

US 2006/0190553 A1    Aug. 24, 2006

(30) Foreign Application Priority Data

Feb. 24, 2005    (JP) ............................. 2005-049458

(51) Int. Cl.
 *G06F 15/167* (2006.01)
(52) U.S. Cl. ................... 709/208; 709/220; 709/238; 714/13
(58) Field of Classification Search .......... 709/220, 709/208, 238; 399/27; 714/13
See application file for complete search history.

(56) References Cited

U.S. PATENT DOCUMENTS

| | | | | |
|---|---|---|---|---|
| 7,054,910 | B1 * | 5/2006 | Nordin et al. ............... | 709/208 |
| 7,164,867 | B2 * | 1/2007 | Yonenaga ..................... | 399/27 |
| 2005/0005003 | A1 | 1/2005 | Maekawa | |
| 2007/0092267 | A1 * | 4/2007 | Yonenaga ...................... | 399/8 |

FOREIGN PATENT DOCUMENTS

| | | |
|---|---|---|
| JP | 11249839 | 9/1999 |
| JP | 2004-062253 | 2/2004 |
| JP | 2004-171093 | 6/2004 |

* cited by examiner

*Primary Examiner*—Jungwon Chang
(74) *Attorney, Agent, or Firm*—Banner & Witcoff, Ltd

(57) ABSTRACT

In a network system including a plurality of devices connected to a network, a master device supplies general devices with shared data to be shared by the devices in the system. On each update of the shared data, the master device generates backup data (the shared data before the backup) and successively transmits a backup instruction to all the devices managed thereby, starting from a device of the lowest priority in the system. Each of the devices successively receiving the backup instruction acquires the backup data from a device having an immediately higher priority than itself. By the above operation, reliable backup of the shared data (enabling restoration of the shared data to that of several times ago after the update is repeated several times) is realized without overloading any device in the system even when the storage capacity of each device for storing the backup data is relatively small.

18 Claims, 29 Drawing Sheets

| ID | Name | Tel | Fax | Mail Address |
|---|---|---|---|---|
| 1 | Koji | 00012345670 | 0001234599 | koji@example.com |
| 2 | Noga | 00012345450 | 0001234599 | noga@example.com |
| 3 | Tom | 01234567890 | 0123234599 | tom@example.com |

FIG. 2

| ID | PRIORITY | IP ADDRESS | MASTER APTITUDE VALUE |
|---|---|---|---|
| 1 | 2nd | 192.0.0.5 | 128 |
| 2 | 3rd | 192.0.0.7 | 64 |
| 3 | 4th | 192.0.0.3 | 32 |

NETWORK SYSTEM, DEVICE AND PROGRAM

CROSS-REFERENCE TO RELATED APPLICATION

This application claims priority under 35 U.S.C. §119 from Japanese Patent Application No. 2005-049458, filed on Feb. 24, 2005. The entire subject matter of the application is incorporated herein by reference.

BACKGROUND

1. Technical Field

The following description relates to a network system, a device forming the network system, and a program for implementing the functions of the device.

2. Related Art

In a network system including a plurality of devices (e.g. network printers) connected to a network, sharing information among the devices in the system is advantageous from various viewpoints. In a technique for such information sharing proposed in Japanese Patent Provisional Publication No. HEI11-249839, the user of the system connecting a new device to the network specifies a device that has already joined the network and the specified device transmits prescribed information to the new device, by which the device newly connected to the network acquires the prescribed information.

However, the above network system is not equipped with a mechanism for restoring the contents of the prescribed information (to be transmitted to a new device) to its original contents in case where the information is updated erroneously. Especially when the update is repeated several times, it is difficult to restore the contents of the information to the information updated several times ago.

As a mechanism for restoring the erroneous contents of the information to the original contents, it is possible to have previously save the information before update as a backup (e.g. backup file) and thereafter update the information. Specifically, in order to restore the contents of the information to those of several times ago after the update is repeated several times, each backup generated on each update of the information has to be saved and accumulated together with already-saved backups, without overwriting (updating) an old backup with a new backup on each update of the information.

However, preserving a number of backups is difficult when the capacity of a storage area for the backup information is limited. In such cases, the restoration of the contents of the prescribed information to those of several times ago (after the update is repeated several times) becomes impossible.

SUMMARY

A network system including a plurality of devices connected to a network, capable of realizing reliable backup of information (enabling the restoration of the information to that of several times ago after the update is repeated several times) without overloading any device in the system, even when the storage capacity of each device for storing the backup information is relatively small, is provided.

BRIEF DESCRIPTION OF THE ACCOMPANYING DRAWINGS

FIG. 2 is a table showing an example of address book data in accordance with aspects of the present invention.

DETAILED DESCRIPTION

General Overview

Figure 1:
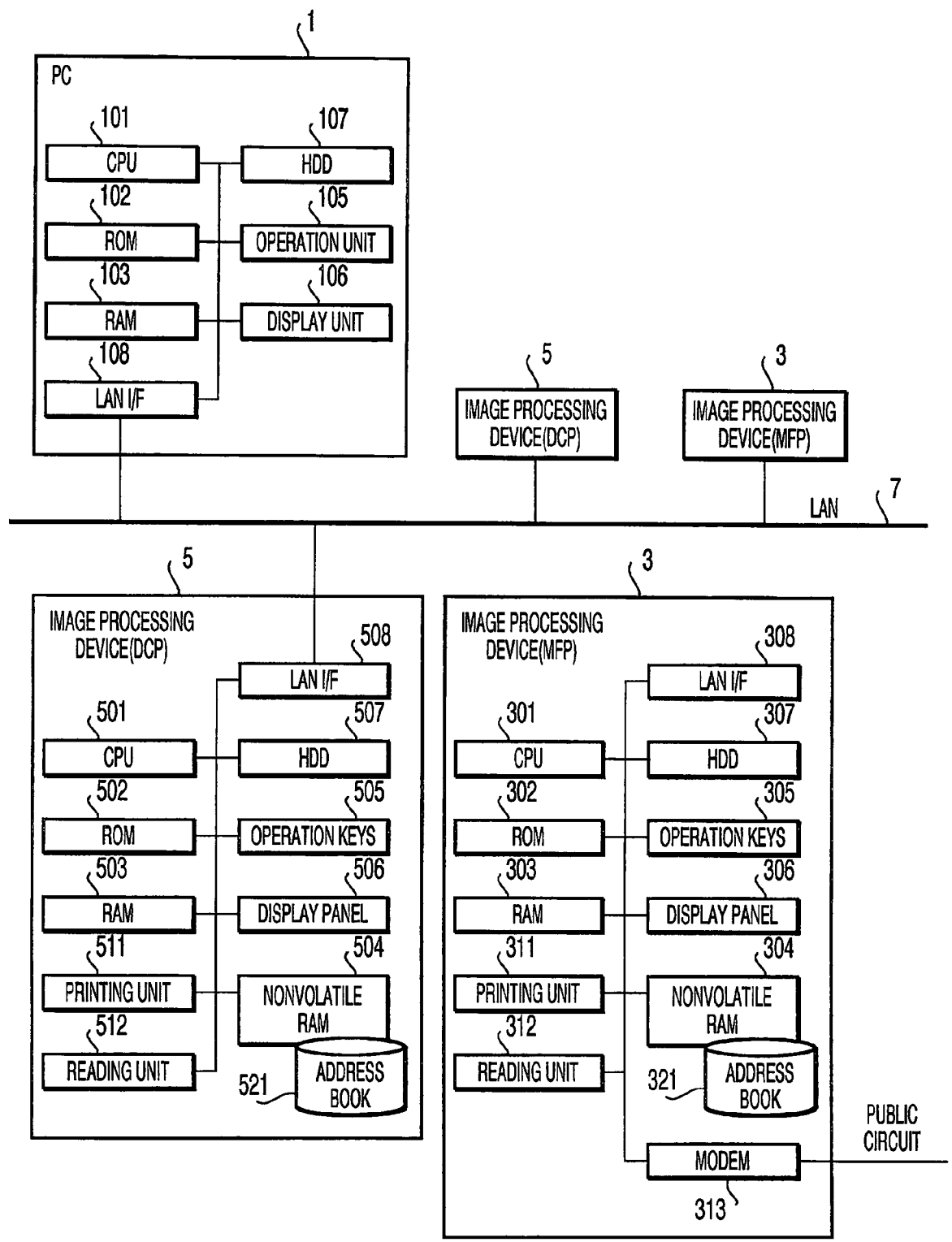
FIG. 1 is a block diagram showing the overall composition of a network system in accordance with an embodiment of the present invention and the internal composition of each device of the network system.

In accordance with an aspect of the present invention, there is provided a network system including a plurality of devices connected to a network each of which is assigned an ordinal rank in the system, in which a device of the highest ordinal rank functions as a master device while devices of the other ordinal ranks function as general devices and shared data to be shared by the plurality of devices is supplied from the master device to the general devices. In the network system, each of the devices includes master device units that operate when the device functions as the master device and general device units that operate when the device functions as a general device. The master device units include: a shared data storing unit that stores the shared data; a shared data updating unit that updates the shared data stored in the shared data storing unit; a first on-update backup data supplying unit that supplies the shared data before update to a lower-level device of the highest ordinal rank in devices lower than the device as backup data when the shared data is updated by the shared data updating unit; an on-restoration backup data acquiring unit that acquires the backup data from a different device when a restoration instruction is given; and a shared data restoring unit that restores the shared data to that before update by storing the backup data acquired by the on-restoration backup data acquiring unit in the shared data storing unit as the shared data. The general device units include: a backup data storing unit that stores the backup data; a backup data updating unit that updates the backup data by acquiring backup data when the backup data is supplied from a different device and storing the acquired backup data in the backup data storing unit; a second on-update backup data supplying unit that supplies the backup data before update to a lower-level device of the highest ordinal rank in devices lower than the device as backup data when the backup data is updated by the backup data updating unit; and an on-restoration backup data supplying unit that supplies the backup data in response to a request from the master device. It is noted that various connections are set forth between elements in the following description. It is noted that these connections in general and, unless specified otherwise, may be direct or indirect and that this specification is not intended to be limiting in this respect.

In the above network system, according to the ordinal ranks assigned to the devices in the system, a device of the highest ordinal rank functions as a master device while devices of the other ordinal ranks function as general devices, and shared data to be shared by the devices is supplied from the master device to the general devices. In the master device, the shared data stored in the shared data storing unit can be updated by the shared data updating unit. When the shared data is updated by the shared data updating unit, the first on-update backup data supplying unit supplies the shared data before the update to a lower-level device of the highest ordinal rank in devices lower than the device, as backup data. In a general device that is supplied with the backup data from a different device, the backup data updating unit updates backup data stored in the backup data storing unit by acquiring the supplied backup data and storing the acquired backup data in the backup data storing unit. When the backup data is updated by the backup data updating unit, the second on-update backup data supplying unit supplies the backup data before the update to a lower-level device of the highest ordinal rank in devices lower than the device, as backup data. Consequently, by the operation of the backup data updating unit and the second on-update backup data supplying unit in each general device, each piece of backup data stored in each general device is transferred to a device of the next ordinal rank. Further, in each general device, the on-restoration backup data supplying unit is capable of supplying the backup data in response to a request from the master device. In the master device, when a restoration instruction (an instruction issued by an input operation by the user, an instruction sent from another device, etc.) is given, the on-restoration backup data acquiring unit acquires the backup data from a different device and the shared data restoring unit restores the shared data to that before update by storing the acquired backup data in the shared data storing unit as the shared data.

In the network system configured as above, even when the storage capacity of the master device is relatively low, the backup data can be distributed and stored in a plurality of general devices, and thus a large amount of backup data can be preserved without excessively consuming the storage area of each device even when all the backup data can not be stored in the master device alone. Further, since the backup data distributed and stored in the plurality of general devices are backup data in a plurality of generations which are successively transferred to devices of lower ordinal ranks each time the update is executed by the master device, the master device restoring the shared data based on the backup data is capable of using old backup data that was generated in an update of several times ago. Furthermore, among the backup data in a plurality of generations (in which newer backup data generated in a newer update is more likely to be used), newer backup data is stored in a device of a higher ordinal rank in the network system. Therefore, in cases where the shared data is data increasing its size on each update, each device can be prevented from running short of storage capacity with high reliability by configuring the system to assign a higher ordinal rank to a device of higher storage capacity. It is also possible to let more usable backup data (that is more likely to be used) be stored in a device of higher reliability by configuring the system to assign a higher ordinal rank to a device of higher reliability.

Configurations that may or may not be made to the above network system are described below.

Preferably, the master device units further include a backup data acquisition instruction transmitting unit that successively transmits an instruction, requesting each device receiving the instruction to acquire the backup data from a higher-level device of the lowest ordinal rank in devices higher than the receiving device, to devices functioning as the general devices starting from a device of the lowest ordinal rank. The general device units further include: a backup data acquisition instruction receiving unit that receives the instruction transmitted from the backup data acquisition instruction transmitting unit of the master device; and a backup data requesting unit that transmits a request for the backup data to a higher-level device of the lowest ordinal rank in devices higher than the device when the instruction is received by the backup data acquisition instruction receiving unit. Each of the first and second on-update backup data supplying units supply the backup data in response to the request from the backup data requesting unit of a different device.

In the above network system, the backup data acquisition instruction transmitting unit of the master device successively transmits an instruction (requesting each receiving device to acquire the backup data from a higher-level device of the lowest ordinal rank in devices higher than the receiving device) to devices functioning as the general devices starting from a device of the lowest ordinal rank. In each general device, the backup data acquisition instruction receiving unit receives the instruction transmitted from the backup data acquisition instruction transmitting unit of the master device. When the instruction is received by the backup data acquisition instruction receiving unit, the backup data requesting unit transmits a request for the backup data to a higher-level device of the lowest ordinal rank in devices higher than the general device. When a device (the master device or a general device) receives the request from the backup data requesting unit of a different device, the backup data is supplied by the first on-update backup data supplying unit (when the device is functioning as the master device) or the second on-update backup data supplying unit (when the device is functioning as a general device).

In the network system configured as above, each device supplies backup data to a device of an immediately lower ordinal rank and then receives newer backup data from a device of an immediately higher ordinal rank, and the action is repeated by the devices. At the point when each device receives the newer backup data from the device of the immediately higher ordinal rank, the older backup data has already been transferred to the device of the immediately lower ordinal rank, and thus no problem is caused by the overwriting of the older backup data with the received newer backup data. Therefore, the successive transfer of the backup data to devices of lower ordinal ranks can be achieved without needing excessively large storage capacity of each device, compared to cases where the successive transfer of backup data is started from the device of the highest ordinal rank.

Preferably, the master device units further include: a device increase/decrease detecting unit that detects an increase/decrease of other devices in the system; and an ordinal rank reassigning unit that redetermines the ordinal ranks of the plurality of devices based on characteristic information representing characteristics of the devices when an increase/decrease of the devices is detected by the device increase/decrease detecting unit. The backup data acquisition instruction transmitting unit successively transmits the instruction to the devices starting from a device of the lowest ordinal rank when the ordinal ranks are redetermined by the ordinal rank reassigning unit.

In the above network system, when an increase/decrease of other devices in the system is detected by the device increase/decrease detecting unit of the master device, the ordinal rank reassigning unit of the master device redetermines the ordinal ranks to the devices based on characteristic information representing characteristics of the devices. The backup data acquisition instruction transmitting unit of the master device successively transmits the instruction (requesting the acquisition of the backup data) to the devices starting from a device of the lowest ordinal rank when the ordinal ranks are redetermined by the ordinal rank reassigning unit.

In the network system configured as above, the ordinal ranks can be reassigned when there is an increase/decrease of devices in the system, and the updating order of the backup data can be reset properly according to the reassigned ordinal ranks.

Preferably, the master device units further include: a backup data information storing unit that stores first information assigned to each piece of backup data for letting a user discriminate among multiple pieces of backup data and second information specifying a device storing each piece of backup data, while associating the first information with the second information; an information reporting unit that reports the first information stored in the backup data information storing unit to the user; a selection input unit that receives an input for selecting a piece of first information from one or more pieces of first information reported by the information reporting unit; and a device determining unit that determines a device that is specified by the second information associated with the first information selected through the selection input unit. The on-restoration backup data acquiring unit requests the device determined by the device determining unit to supply the backup data and acquires the backup data supplied in response to the request when the restoration instruction is given.

In the above network system, the backup data information storing unit of the master device stores the first information assigned to each piece of backup data for letting a user discriminate among multiple pieces of backup data (date/time of storage, backup data file name, etc.) and second information specifying a device storing each piece of backup data (device name, serial number of the device, etc.) while associating the first information with the second information. The information reporting unit of the master device reports the first information stored in the backup data information storing unit to the user. The selection input unit is configured to be able to receive an input for selecting a piece of first information from one or more pieces of first information reported by the information reporting unit. The device determining unit of the master device determines a device that is specified by the second information associated with the first information selected through the selection input unit. After the above determination of the device, when the restoration instruction is given, the on-restoration backup data acquiring unit requests the device determined by the device determining unit to supply the backup data and acquires the backup data supplied in response to the request.

In the network system configured as above, the user referring to the first information reported by the information reporting unit can select desired backup data and make the restoration of the shared data according to the desired backup data only by making the selection.

Preferably, the master device units further include: an ordinal rank determining unit that determines the ordinal ranks of the plurality of devices based on characteristic information representing characteristics of the devices; a master replacement reporting unit that reports to a higher-level device of an ordinal rank higher than the device that the higher-level device should function as the master device when the devices ranked by the ordinal rank determining unit include such a higher-level device; and a shared data transmitting unit that transmits the shared data to the higher-level device receiving the report from the master replacement reporting unit. The general device units further include: a control unit that controls the device to let it function as the master device when the report indicating that the device itself should function as the master device is received from the present master device; and a shared data receiving unit that receives the shared data from the master device sending the report.

In the above network system, the ordinal rank determining unit of the master device determines the ordinal ranks of the plurality of devices based on characteristic information representing characteristics of the devices. When the devices ranked by the ordinal rank determining unit include a higher-level device of an ordinal rank higher than the device (master device), the master replacement reporting unit reports to the higher-level device that the higher-level device should function as the master device and the shared data transmitting unit transmits the shared data to the higher-level device receiving the report from the master replacement reporting unit. In each general device, when the report indicating that the device itself should function as the master device is received from the present master device, the control unit controls the device to let it function as the master device and the shared data receiving unit receives the shared data from the master device.

In the network system configured as above, a device of the highest ordinal rank (determined based on the characteristics of each device) recognizes that the device itself should function as the master device and takes over the shared data from the former (present) master device, by which a device most suitable as the master device starts functioning as the master device and the other devices are allowed to use the shared data as before.

Preferably, the master device units further include an update information acquiring unit that acquires update information on the shared data updated in a different device from the different device. The shared data updating unit is configured to update the shared data stored in the shared data storing unit based on the update information acquired by the update information acquiring unit. The general device units further include: an update input unit that receives an input for updating the shared data; and an update information supplying unit that generates the update information on the shared data based on the input received by the update input unit and supplies the update information to the master device.

In the above network system, in each general device, the update input unit receives an input for updating the shared data, and the update information supplying unit generates update information on the shared data based on the input received by the update input unit and supplies the update information to the master device. In the master device, the update information acquiring unit acquires the update information on the shared data updated in a different device from the different device, and the shared data updating unit updates the shared data stored in the shared data storing unit based on the update information acquired by the update information acquiring unit.

In the network system configured as above, the shared data stored in the master device can be updated by use of a general device. Incidentally, the updated shared data can of course be used by any device in the system since the shared data after the update is supplied from the master device to all the general devices.

In the above configuration, the update input unit may be configured to receive an input operation by a user as the input for updating the shared data.

In the above network system, the user performs an input operation to a general device for updating the shared data, by which the shared data can be updated.

Incidentally, it is also possible to employ another configuration updating the shared data without receiving the input operation by the user. For example, each general device may be configured to acquire update data from another device by data communication and update the shared data based on the acquired update data.

Preferably, the master device units further include an update input unit that receives an input for updating the shared data. The shared data updating unit is configured to generate update information on the shared data based on the input received by the update input unit and update the shared data stored in the shared data storing unit based on the update information.

In the above network system, the update input unit of the master device receives an input for updating the shared data. The shared data updating unit of the master device generates update information on the shared data based on the input received by the update input unit and updates the shared data stored in the shared data storing unit based on the update information.

In the network system configured as above, the shared data stored in the master device can be updated by use of the master device. Also in this configuration, the updated shared data can of course be used by any device in the system since the shared data after the update is supplied from the master device to all the general devices. Incidentally, if this configuration is combined with the aforementioned configuration in which the general device units include the update input unit, the update of the shared data can be made by use of any device sharing the shared data, without the need of being aware of whether the device is the master device or a general device.

In the above configuration, the update input unit may be configured to receive an input operation by a user as the input for updating the shared data.

In the above network system, the user performs an input operation to the master device for updating the shared data, by which the shared data can be updated.

Incidentally, it is also possible to employ another configuration updating the shared data without receiving the input operation by the user. For example, the master device may be configured to acquire update data from another device by data communication and update the shared data based on the acquired update data.

In the above network systems, the characteristic information may be information incorporating storage capacity of each device.

Specifically, when each device is equipped with a hard disk or nonvolatile memory, the storage capacity of the hard disk or nonvolatile memory may be incorporated into the characteristic information.

In the network system configured as above, ordinal ranks incorporating the storage capacity of each device are assigned to the devices. In this case, a device having a larger storage capacity is assigned a higher ordinal rank when other conditions are the same and such a device is more likely to become the master device. Such characteristic information is suitable when the master device has a function of storing a variety of information and supplying the information to other devices.

The characteristic information may also be information incorporating processing power of each device.

Specifically, the performance of the CPU, the storage capacity or bit rate of the RAM, the communication speed with the network, etc. may be incorporated into the characteristic information. In cases where a newer device tends to have higher performance, the shipping date of each device may be incorporated into the characteristic information.

In the network system configured as above, ordinal ranks incorporating the processing power of each device are assigned to the devices. In this case, a device having higher processing power is assigned a higher ordinal rank when other conditions are the same and such a device is more likely to become the master device. Such characteristic information is suitable when the master device has to quickly supply a variety of information to other devices, when the master device has to perform various calculations, when the master device has to receive and output a lot of data, etc.

The characteristic information may also be information incorporating continuous operability of each device.

The "continuous operability" means how long each device is expected to operate continuously, that is, how low the probability of shutdown (power off) is. For example, a device having no main power switch is regarded to have higher continuous operability than a device having a main power switch. Further, a device having the FAX function or telephone function is regarded to have higher continuous operability than a device having no FAX function or telephone function, since the former device generally operates continuously to wait for a call while the latter device (e.g. single-function printer) tends to be turned off when it is unnecessary.

In the network system configured as above, ordinal ranks incorporating the continuous operability of each device are assigned to the devices. In this case, a device having higher continuous operability is assigned a higher ordinal rank when other conditions are the same and such a device is more likely to become the master device. Such characteristic information is suitable for preventing frequent change of the master device caused by frequent shutdown of the master device, by which the processing/communication load on each device caused by the change of the master device can be reduced.

Preferably, each of the devices is a communication device having a function of transmitting data to a destination specified by address data, and the shared data is address book data including the address data.

In the network system configured as above, each device is allowed to transmit data to a destination specified by address data based on the address book data supplied from the master device as the shared data, by which all the devices become equally capable of communicating with the same address contained in the address book data.

In accordance with another aspect of the present invention, there is provided a device that is used as a node forming a network system including a plurality of devices connected to a network each of which is assigned an ordinal rank in the system in which a device of the highest ordinal rank functions as a master device while devices of the other ordinal ranks function as general devices and shared data to be shared by the plurality of devices is supplied from the master device to the general devices. The device includes master device units that operate when the device functions as the master device and general device units that operate when the device functions as a general device. The master device units include: a shared data storing unit that stores the shared data; a shared data updating unit that updates the shared data stored in the shared data storing unit; a first on-update backup data supplying unit that supplies the shared data before update to a lower-level device of the highest ordinal rank in devices lower than the device as backup data when the shared data is updated by the shared data updating unit; an on-restoration backup data acquiring unit that acquires the backup data from a different device when a restoration instruction is given; and a shared data restoring unit that restores the shared data to that before update by storing the backup data acquired by the on-restoration backup data acquiring unit in the shared data storing unit as the shared data. The general device units include: a backup data storing unit that stores the backup data; a backup data updating unit that updates the backup data by acquiring backup data when the backup data is supplied from a different device and storing the acquired backup data in the backup data storing unit; a second on-update backup data supplying unit that supplies the backup data before update to a lower-level device of the highest ordinal rank in devices lower than the device as backup data when the backup data is updated by the backup data updating unit; and an on-restoration backup data supplying unit that supplies the backup data in response to a request from the master device.

The device configured as above is equipped with the same units as the device in the network system that has been described above, and thus such a network system can be formed and the same effects can be achieved by use of the device.

The device is a system element equivalent to the device in the aforementioned network system as mentioned above, and thus the device may of course be further provided with the aforementioned configurations desirable to the device in the aforementioned network system.

In accordance with another aspect of the present invention, there is provided a computer program on a computer readable medium where the program includes computer-readable instructions that cause a device, as a node forming a network system including a plurality of devices connected to a network each of which is assigned an ordinal rank in the system in which a device of the highest ordinal rank functions as a master device while devices of the other ordinal ranks function as general devices and shared data to be shared by the plurality of devices is supplied from the master device to the general devices, to function as: master device units that operate when the device functions as the master device; and general device units that operate when the device functions as a general device. The master device units include: a shared data storing unit which stores the shared data; a shared data updating unit that updates the shared data stored in the shared data storing unit; a first on-update backup data supplying unit that supplies the shared data before update to a lower-level device of the highest ordinal rank in devices lower than the device as backup data when the shared data is updated by the shared data updating unit; an on-restoration backup data acquiring unit that acquires the backup data from a different device when a restoration instruction is given; and a shared data restoring unit that restores the shared data to that before update by storing the backup data acquired by the on-restoration backup data acquiring unit in the shared data storing unit as the shared data. The general device units include: a backup data storing unit that stores the backup data; a backup data updating unit that updates the backup data by acquiring backup data when the backup data is supplied from a different device and storing the acquired backup data in the backup data storing unit; a second on-update backup data supplying unit that supplies the backup data before update to a lower-level device of the highest ordinal rank in devices lower than the device as backup data when the backup data is updated by the backup data updating unit; and an on-restoration backup data supplying unit that supplies the backup data in response to a request from the master device.

By letting the device execute the computer-readable instructions of the computer program product, the device functions in the same way as the device in the network system which has been described above, and thus such a network system can be formed and the same effects can be achieved by use of the device.

The device executing the computer-readable instructions functions as a system element equivalent to the device in the aforementioned network system as mentioned above, and thus the computer-readable instructions may of course further include instructions implementing the aforementioned configurations desirable to the device in the aforementioned network system.

Illustrative Embodiments

Referring now to the drawings, a description will be given in detail of an illustrative embodiment in accordance with the present invention.

FIG. 1 is a block diagram showing the overall composition of a network system according to the embodiment.

The network system includes a PC (Personal Computer) 1 and a plurality of image processing devices 3, 3, 5 and 5 which are connected together by a LAN (Local Area Network) 7 to communicate data.

The PC 1 includes a CPU (Central Processing Unit) 101, a ROM (Read Only Memory) 102, a RAM (Random Access Memory) 103, an operation unit 105, a display unit 106, an HDD (Hard Disk Drive) 107, a LAN I/F (interface) 108, etc. The CPU 101 is a unit for controlling each part of the PC 1 and performing various calculations according to programs stored in the ROM 102 and the RAM 103. The ROM 102 is a storage unit capable of holding its memory contents even when the power switch of the PC 1 is turned OFF, in which bare essentials of programs and data necessary for the control of the PC 1, such as a BIOS (Basic Input Output System), is stored. The RAM 103 is a storage unit capable of storing an OS (Operating System) and various application programs read out from the HDD 107, in which various data generated during calculations by the CPU 101 are also stored. The operation unit 105 is formed by a keyboard, various pointing devices (e.g. mouse), etc. The display unit 106 is formed by an LCD (Liquid Crystal Display) capable displaying color images, etc. The HDD 107 is a storage unit storing the OS, the various application programs, and various data files. The LAN I/F 108 is a unit for controlling the communication via the LAN 7. The OS is installed in the PC 1 for controlling the above hardware. Concrete examples of the OS installed in the PC 1 include Windows®, Linux®, Mac OS®, etc. Since various functions provided by these operating systems are widely known, detailed explanation thereof is omitted here. In the following explanation, the PC 1 is assumed to have various functions provided by Windows®.

The image processing device 3 is a multifunctional device called "MFP" (Multi-Function Product), which is provided with a scanner function, a printer function, a copy function, a facsimile function, a telephone function, an e-mail transmission/reception function, etc. The image processing device 3 includes a CPU 301, a ROM 302, a RAM 303, a nonvolatile RAM 304, operation keys 305, a display panel 306, an HDD 307, a LAN I/F 308, a printing unit 311, a reading unit 312, a modem 313, etc. The CPU 301 is a unit for controlling each part of the image processing device 3 and performing various calculations according to programs stored in the ROM 302. The ROM 302 stores programs and data necessary for the control of the image processing device 3. The RAM 303 is a storage unit for mainly storing various data generated during calculations by the CPU 301. Since access speed of the RAM 303 is higher than those of the nonvolatile RAM 304 and the HDD 307, part of data stored in the nonvolatile RAM 304 and the HDD 307 can be transferred to the RAM 303 and used during the operation of the image processing device 3. The nonvolatile RAM 304 is a storage unit configured to hold its memory contents by use of an embedded battery even when the power switch of the image processing device 3 is turned OFF. In this embodiment, the nonvolatile RAM 304 stores address book data 321 and backup data (not shown), which will be explained in detail later. The operation keys 305 are input devices operated by the user for giving various instructions to the image processing device 3. The display panel 306 is formed by an LCD. The HDD 307 is a storage unit storing various data. In this embodiment, the HDD 307 is mainly used for temporarily storing image data read by the reading unit 312. The LAN I/F 308 is a unit for controlling the communication via the LAN 7. The printing unit 311 is a unit for recording (printing) an image represented by image data on a sheet-like medium (e.g. paper). The printing unit 311 operates when an image is printed by the printer function, when a received image is printed by the facsimile function, when a copy image is printed by the copy function, etc. The reading unit 312 is a unit for reading an image from a document set in an not shown ADF (Automatic Document Feeder) or a document placed on contact glass of a flat bed and thereby generating image data representing the image. The reading unit 312 operates when an image is read by the scanner function, when an image to be transmitted is read by the facsimile function, etc. The modem 313 is a unit necessary for voice communication and transmission/reception of facsimile images via a public circuit.

The image processing device 5 is a multifunctional device called "DCP" (Digital Copier Peripheral). The image processing device 5 is provided with the scanner function, the printer function, the copy function, the e-mail transmission/reception function, etc., but is not provided with the facsimile function and the telephone function differently from the image processing device 3. The image processing device 5 includes a CPU 501, a ROM 502, a RAM 503, a nonvolatile RAM 504, operation keys 505, a display panel 506, an HDD 507, a LAN I/F 508, a printing unit 511, a reading unit 512, etc. The above components are substantially identical with those of the image processing device 3, and thus detailed explanation thereof is omitted here. The image processing device 5 does not include a component corresponding to the modem 313 of the image processing device 3 since the image processing device 5 is not provided with the facsimile function nor the telephone function.

Incidentally, while only four image processing devices 3, 3, 5 and 5 are shown in FIG. 1 for the sake of convenience, the network system may actually include more image processing devices (devices) connected to the LAN 7.

In the network system configured as above, the devices on the network (the image processing devices 3, 3, 5 and 5 in this embodiment) execute processes which will be explained later, by which one of the devices functions as a "master device" and devices other than the master device function as "general devices". While which of the devices should function as the master device is determined in a process explained later, the outline is as follows: In this network system, an ordinal rank in the system is assigned to each device, and a device of a higher rank shifts into a state for functioning as the master device with higher priority. In the following, such an ordinal rank assigned to each device will also be referred to as "a priority".

The device functioning as the master device is required to play a variety of roles as follows:
(1) Manage the general devices existing in the system and supply "shared data" (data to be shared by all the devices in the system) to each general device;
(2) Generate a backup of the shared data (before update) on each update of the shared data while managing multiple pieces of backup data which have been generated in previous updates of the shared data so that the shared data can be restored in case it is updated erroneously;
(3) Manage the priorities (ordinal ranks) of the devices in the system, while reassigning the priorities to all the devices when the number of devices in the system has increased or decreased; and
(4) When a device having a higher priority than the master device exists in the system as a result of the priority reassignment, replace the master device with the high-priority device.

In this embodiment, the "shared data" to be shared by all the devices in the system is the aforementioned address book data. FIG. 2 is a table showing an example of the address book data. As shown in FIG. 2, multiple pieces of data (each of which is a combination of an ID, a name, a telephone number, a FAX number and a mail address, for example) are registered as the address book data. The latest address book data is supplied from the master device when a device is added to the system. Each device receiving the latest address book data stores the data in its own nonvolatile RAM (304, 504) as "master data". When a device updates its own address book data, the address book data in the master device is first updated accordingly by a process explained later, and thereafter the latest address book data (updated in the master device) is supplied to each device on the network. Consequently, the devices on the network consistently store the latest and identical address book data.

Further, on the update of the address book data, a copy of the master data (i.e. address book data) before the update is stored as the backup data by a process which will be explained later. A piece of backup data is stored as a separate file on each update of the master data, by which multiple pieces of backup data are accumulated as the update of the master data is repeated. Since simple accumulation of the backup data causes an unlimited increase of storage capacity (storage areas) occupied by the backup data, in this embodiment, the backup data is accumulated to keep the data size of the backup data within a prescribed storage capacity by deleting the oldest backup data when the data size of the accumulated backup data exceeds the prescribed storage capacity. Incidentally, the method for preventing the unlimited increase of backup data may be selected arbitrarily. For example, it is also possible to previously specify how many pieces of previous backup data should be accumulated, instead of restricting the upper limit of the data size of the accumulated backup data.

The multiple pieces of backup data generated corresponding to a plurality of updates are stored in the master device within a prescribed storage capacity, while each of the multiple pieces of backup data is stored in each of the general devices respectively so as to let newer backup data be stored in a general device having higher priority, by a process which will be explained later. For example, when the address book data is updated in the case where the system includes four devices (including one master device and three general devices), backup data #1 having the contents of the address book data before the update is generated. The backup data #1 is stored in the master device, while being transmitted to a general device having the highest priority (i.e. a device having the second priority in the system (since the master device has the first priority)) and stored in the general device having the highest priority (second priority in the system). When the address book data is updated further, the existing backup data #1 is renamed "backup data #2", while a copy of the address book data before the update is made as (new) "backup data #1". At this stage, both the backup data #1 and #2 are stored in the master device. The (old) backup data #1 already stored in the general device having the highest priority (second priority in the system) is transmitted to a device having the next priority (third priority in the system) and stored in the device as "backup data #2". The new backup data #1 is transmitted from the master device to the general device having the highest priority (second priority in the system) and the old backup data #1 already stored in the general device is overwritten with the new backup data #1. Thereafter, as the update of the address book data is repeated, multiple pieces of backup data are accumulated in the master device as separate files, while each general device stores a piece of backup data in order of decreasing priority (starting from the general device having the highest priority). A concrete process for realizing such a data backup method will be explained in detail later.

Incidentally, when the facsimile function, the telephone function or the e-mail transmission function of the image processing device 3 is used, the user of the image processing device 3 can refer to the address book data stored in the device and thereby select the destination of data transmission or a telephone call. In the case of the image processing device 5 which is not provided with the facsimile function nor the telephone function, the user of the image processing device 5 using its e-mail transmission function can refer to the address book data stored in the device and thereby select the destination of data transmission (e-mail). The e-mail transmission function is a function capable of converting image data read by the scanner function into data of an e-mail format and transmitting an e-mail containing the data to the destination. Each image processing device (3, 5), also having the e-mail reception function as the counterpart of the e-mail transmission function, is capable of receiving an e-mail and printing out image data contained in the e-mail by use of its printer function.

In the following, processes executed by each device on the network (image processing device 3, 3, 5, 5) for realizing such a network system will be explained in detail. In the following explanation, each of the image processing devices 3, 3, 5 and 5 will be collectively called "the device" as long as the discrimination between the image processing devices 3 and the image processing devices 5 is unnecessary.

First, a process which is executed when the power of the device is turned ON will be described referring to a flow chart of FIG. 3.

When the power is turned ON, the device first transmits (broadcasts) a "master aptitude value" (S105). The master aptitude value is a value which will be used for determining the aforementioned "priority" of the device. In this embodiment, a value determined by the expression: (nonvolatile RAM capacity)×(continuous operability index: 2 in a device with the FAX function, 1 in a device without the FAX function) is transmitted as the master aptitude value. Therefore, the master aptitude value of a device becomes higher when the device has a nonvolatile RAM (304, 504) of a higher capacity or the FAX function. In a process explained later, a device having a higher master aptitude value is judged to have a higher priority, by which a device having the highest master aptitude value will function as the master device. The priority of each device is determined as above for the following reasons. A device having a higher nonvolatile RAM capacity has a greater ability for preserving the backup data, and such a device is considered to be suitable as the master device. Meanwhile, a device having the FAX function, less likely to be turned OFF, is expected to be highly capable of constantly supplying the address book data and monitoring the increase/decrease of devices in the system, and such a device is considered to be suitable as the master device.

After the transmission of the master aptitude value (S105), the device checks whether a reply from the master device has been received or not (S110). If no reply has been received (S110: NO), the device waits until a prescribed time period (e.g. 1 second) elapses (S115) and thereafter checks whether a timeout has occurred or not (S120). If no timeout has occurred (S120: NO), the process returns to the step S110. The loop of S110-S120 is repeated until a reply from the master device is received or the timeout occurs.

When the timeout occurs during the repetition of the loop of S110-S120 (S120: YES), it means that no master device (for replying to the master aptitude value) exists on the network. In this case, the device recognizes that the device itself should function as the master device and generates "management information" (S125). The details of the step S125 will be explained later.

Figure 3:
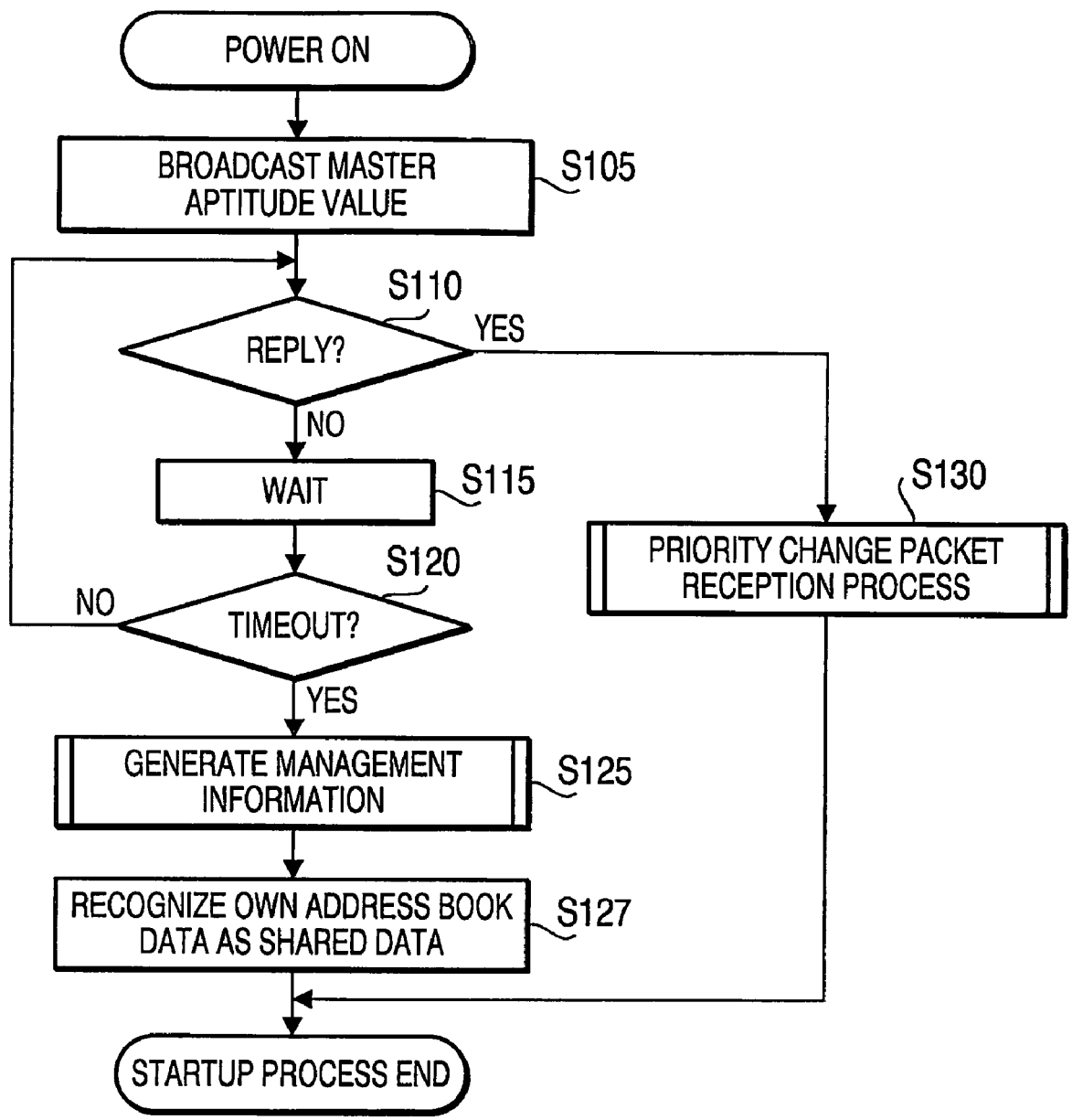
FIG. 3 is a flow chart showing a process executed by each device in the network system when the power of the device is turned ON in accordance with aspects of the present invention.

After finishing the step S125, the device recognizes the address book data stored therein as the shared data (S127) and ends the process of FIG. 3. As for the method of recognition, the device may be designed to recognize its address book data as the shared data by copying the address book data (or shaped address book data) to its storage area for the shared data, or the device may be programmed right from the start to supply the address book data itself as the shared data.

On the other hand, when a reply from the master device is received during the repetition of the loop of S110-S120 (S110: YES), the device executes a priority change packet reception process (S130) and ends the process of FIG. 3. The details of the step S130 will be explained later.

Figures 4, 5:
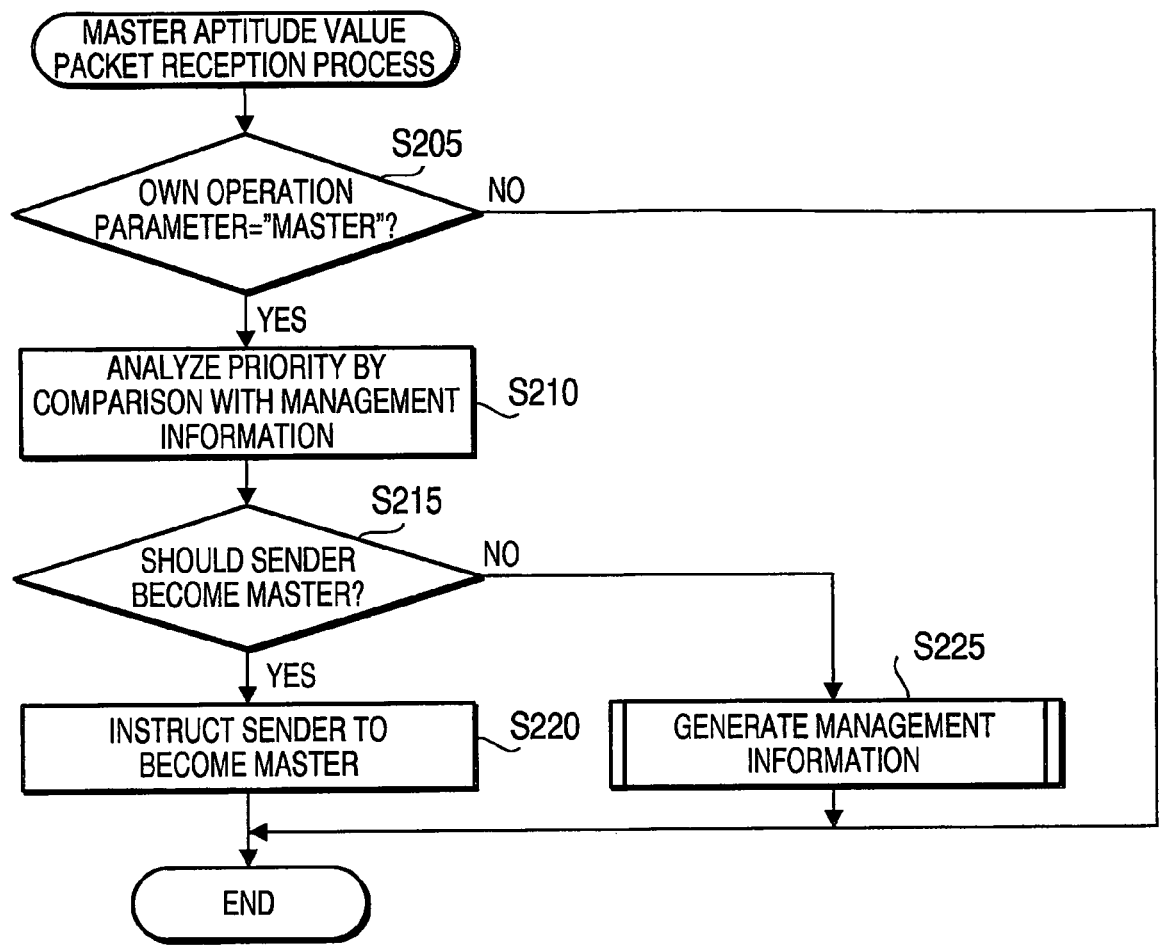
FIG. 4 is a flow chart showing a master aptitude value packet reception process in accordance with aspects of the present invention.
FIG. 5 is a table showing an example of management information in accordance with aspects of the present invention.

Next, a master aptitude value packet reception process which is executed by the device upon reception of a master aptitude value packet (a packet transmitted in the step S105 of FIG. 3 to represent the master aptitude value) as an interrupt routine (hereinafter referred to as an "event handler") in response to the receive event will be explained referring to a flow chart of FIG. 4.

The device starting the master aptitude value packet reception process upon reception of the master aptitude value packet first judges whether its own operation parameter represents "master" or not (S205). The operation parameter is a flag indicating whether the device is in a state for functioning as the master device or in a state for functioning as a general device. If the operation parameter does not represent "master" (S205: NO), the device immediately ends the process. Therefore, in the state for functioning as a general device, the device executes no substantial process in the master aptitude value packet reception process.

On the other hand, if the operation parameter represents "master" (S205: YES), the device in the state for functioning as the master device compares the received master aptitude value with the management information and thereby analyzes the priority of the device transmitting the master aptitude value packet (S210). The management information is information generated by the device functioning as the master device (in a process explained later) and stored in its storage are (e.g. HDD 307 or 507). As shown in FIG. 5, multiple pieces of data (each of which is a combination of an ID, a priority, an IP address and a master aptitude value, for example) are registered as the management information. In the step S210, the device functioning as the master device compares the received master aptitude value with the master aptitude values recorded in the management information and thereby analyzes whether the device that transmitted the master aptitude value packet has a higher priority (a higher master aptitude value) than the present master device (itself).

If the sender (the device that transmitted the master aptitude value packet) should become the master device based on the result of the analysis of S210 (S215: YES), the present master device instructs the sender to become the master device (S220) and ends the master aptitude value packet reception process. On the other hand, if the present master device should keep on functioning as the master device based on the result of the analysis of S210 (S215: NO), the device generates the management information (S225) and ends the master aptitude value packet reception process. The step S225 is equivalent to the aforementioned step S125. The details of the step S225 (S125) will be explained below.

Next, the management information generating process (S215, S225) will be explained in detail referring to a flow chart of FIG. 6.

The device starting the management information generating process broadcasts an instruction for requesting all the general devices to send back their master aptitude values (S305) and receives replies (master aptitude value packets) from other devices for a prescribed waiting time period (e.g. 5 seconds) (S310). Subsequently, the device generates the management information explained above (see FIG. 5) based on the received master aptitude value packets and its own master aptitude value (S315) and judges whether its own master aptitude value is the highest or not by referring to the generated management information (S320). Incidentally, when there is no reply to the broadcast of S305, the device naturally judges that its own master aptitude value is the highest since the generated management information includes the master aptitude value of the device only.

If the master aptitude value of its own (i.e. the present master device) is not the highest (S320: NO), the device instructs a device having the highest master aptitude value to become the master device (S330) and ends the management information generating process. The device receiving the instruction of S330 executes the priority change packet reception process (explained later, see FIG. 7).

On the other hand, if the master aptitude value of its own (i.e. the present master device) is the highest (S320: YES), the device transmits a packet containing the following three pieces of information:
(1) priority-specifying information;
(2) device address information for monitoring; and
(3) address information on the master device to the managed devices (devices registered in the management information) (S340). Each device receiving the packet of S340 (each device registered in the management information) executes the priority change packet reception process (explained later, see FIG. 7) and sends back a reply to the received packet to the master device (the device executing the management information generating process).

After finishing the step S340, the device checks whether the reply has been received from all the managed devices or not (S350), waits a prescribed time period (e.g. 1 second) (S355) if the reply has not been received from all the managed devices (S350: NO), and thereafter checks whether a timeout has occurred or not (S360). If no timeout has occurred (S360: NO), the process returns to the step S350. The loop of S350-S360 is repeated until the reply is received from all the managed devices or the timeout occurs.

When the timeout occurs during the repetition of the loop of S350-S360 (S360: YES), it means that no device for replying to the packet exists on the network. In this case, the device recognizing that the contents of the management information are already invalid returns to the step S315 to redo the process from S315.

On the other hand, when the reply is received from all the managed devices during the repetition of the loop of S350-S360 (S350: YES), the device sets a flag representing "master" to its own operation parameter (S365) and ends the management information generating process.

Next, the priority change packet reception process, which is executed by a device receiving the instruction of the step S220 of FIG. 4 or the step S330 of FIG. 6 (requesting the device to function as the master device) or the priority-specifying information transmitted in the step S340 of FIG. 6 as the event handler for this receive event, will be explained referring to a flow chart of FIG. 7.

The device starting the priority change packet reception process first judges whether the received instruction/information indicates that the device should change into the master device or not (S405).

If the device should change into the master device (S405: YES), the device checks whether the device is generating the management information or not (S410). If the device is generating the management information (S410: YES), it means that the device had recognized that the device itself should function as the master device before the start of this process. In this case, the device immediately ends this event handler process. If the device is not generating the management information (S410: NO), the device, recognizing that the device itself should function as the master device at this point, acquires the master data of the address book data from the present master device (S415).

Figure 7:
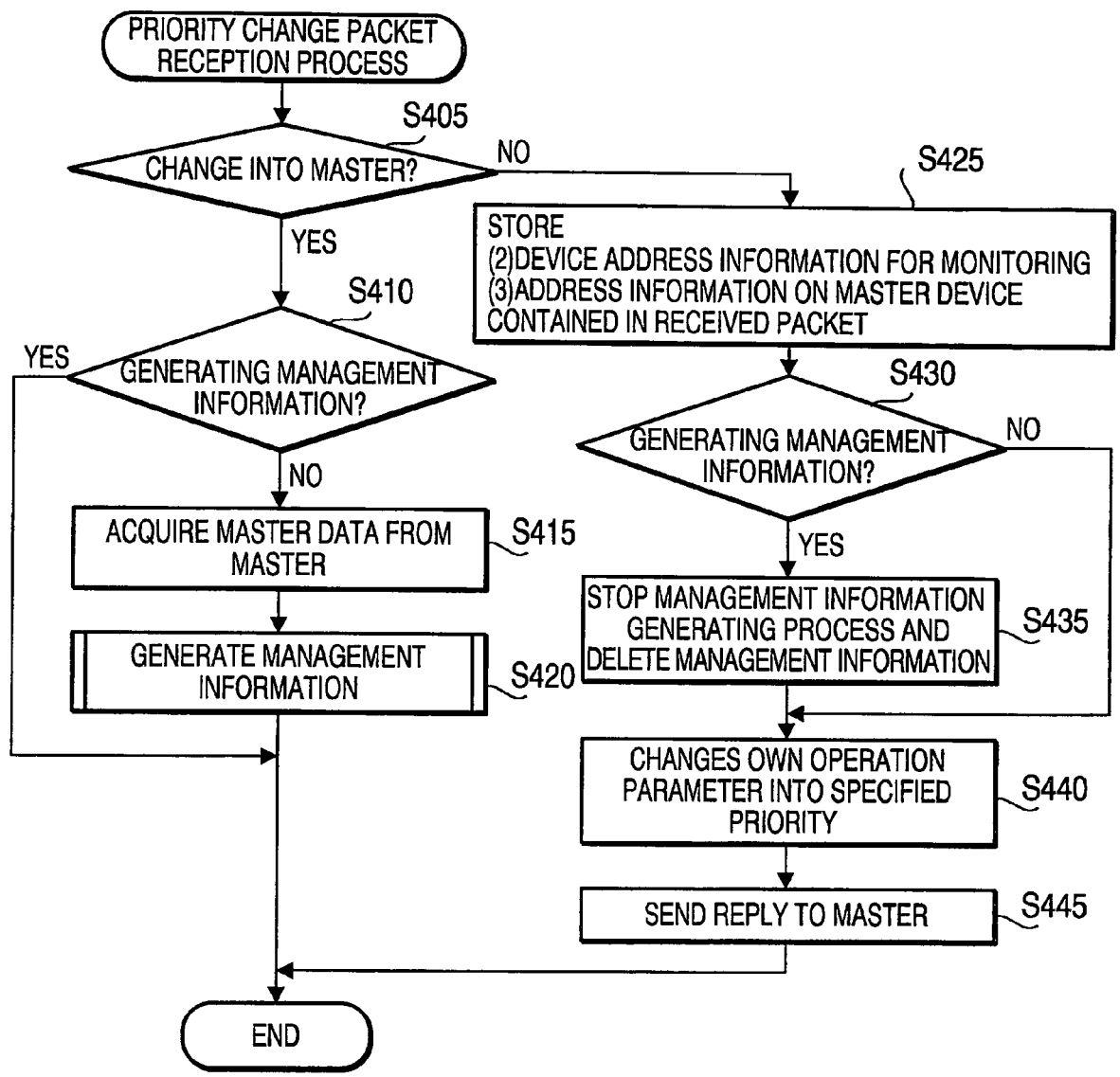
FIG. 7 is a flow chart showing a priority change packet reception process in accordance with aspects of the present invention.
Figure 8:
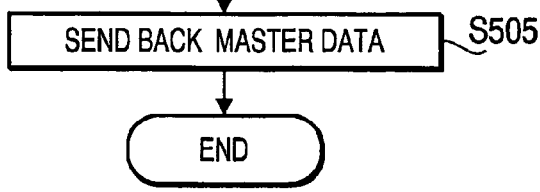
FIG. 8 is a flow chart showing a master data acquisition request reception process in accordance with aspects of the present invention.

Specifically, in the step S415, the device transmits a master data acquisition request to the present master device. The master device receiving the master data acquisition request executes a master data acquisition request reception process shown in FIG. 8 as the event handler for this receive event. By executing the master data acquisition request reception process, the master device sends back the master data to the requesting device (S505), by which the device acquires the master data (S415 in FIG. 7).

After acquiring the master data (S415), the device generates the management information (S420) and ends the priority change packet reception process. The step S420 is equivalent to the management information generating process of FIG. 6 (S305-S365) already explained above and thus repeated explanation thereof is omitted here.

On the other hand, if the device should not change into the master device (S405: NO), the device stores "(2) device address information for monitoring" and "(3) address information on the master device" in its nonvolatile RAM 304, 504 (S425). Subsequently, the device checks whether the device is generating the management information or not (S430). If the device is generating the management information (S430: YES), it means that the device had erroneously recognized that the device itself should function as the master device before the start of this process even though the device should not function as the master device. In this case, the device stops the management information generating process and deletes the management information generated so far (S435), by which the device executing this priority change packet reception process is prevented from starting to function as the master device in this state in which there exists another device for transmitting the priority change packet (i.e. a device already functioning as the master device). Incidentally, if the device is not generating the management information (S430: NO), the step S435 is skipped since the device is not going to function as the master device.

Subsequently, the device changes its own operation parameter into the specified priority (S440), sends a reply (indicating that its priority has changed into that specified by the master device) to the master device (S445) and ends the priority change packet reception process. Incidentally, the reply sent to the master device in the step S445 is the aforementioned reply received by the master device during the loop of S350-S360 in FIG. 6.

Figure 9:
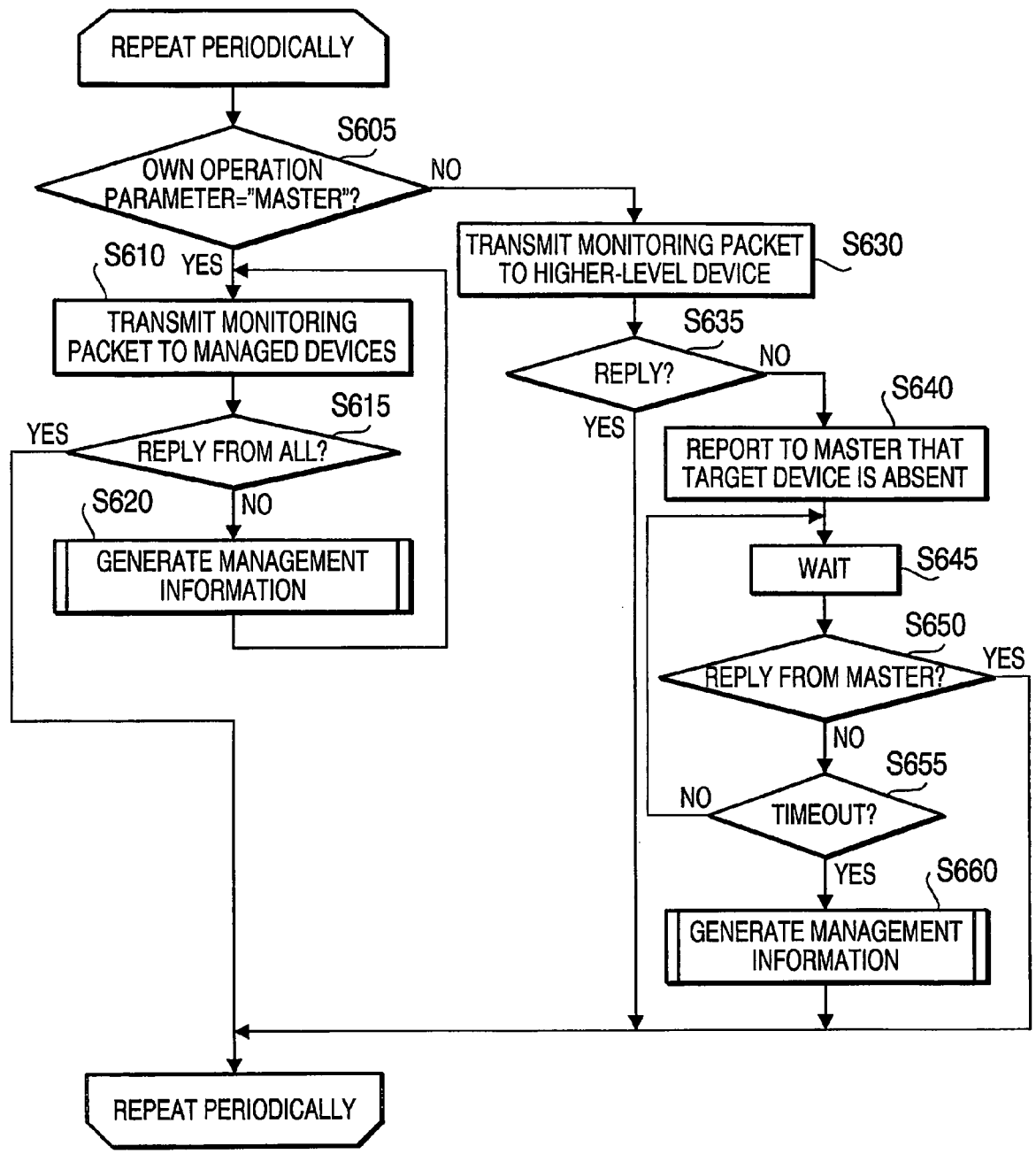
FIG. 9 is a flow chart showing a process repeated by each device periodically in accordance with aspects of the present invention.

Next, a process repeated by each device periodically or substantially at fixed time periods (periodic handler) will be explained referring to a flow chart of FIG. 9.

The device starting this process first judges whether its own operation parameter is "master" or not (S605). If its own operation parameter is "master" (S605: YES), the device as the master device transmits a monitoring packet to the managed devices (S610).

Figure 10:
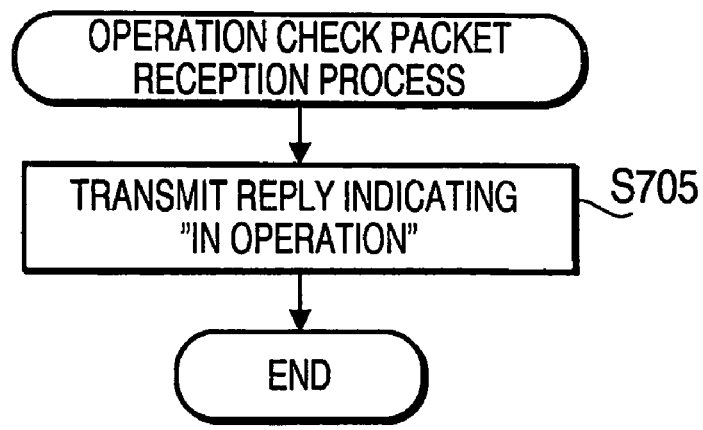
FIG. 10 is a flow chart showing an operation check packet reception process in accordance with aspects of the present invention.

Each managed device (general device) receiving the monitoring packet executes an operation check packet reception process shown in FIG. 10 as the event handler for this receive event, by which a reply indicating that the general device is in operation is sent to the master device (S705).

After a while, the device as the master device checks whether or not the reply has already been received from all the devices to which the monitoring packet was transmitted (S615). If the reply has been received from all the devices (S615: YES), the master device recognizes that all the managed devices (general devices registered in the management information) are in operation as before and ends the process of FIG. 9.

If at least one of the devices has not returned the reply yet (S615: NO), the device as the master device recognizes that not all the managed devices (general devices registered in the management information) are in operation as before, and regenerates the management information by executing the management information generating process (S620). The step S620 is equivalent to the management information generating process of FIG. 6 (S305-S365) already explained above and thus repeated explanation thereof is omitted here.

After regenerating the management information (S620), the device returns to the step S610 to repeat the sequence from S610, by which the device checks whether all the latest managed devices (general devices registered in the regenerated management information) are in operation or not.

In the judgment of S605, if its own operation parameter is not "master" (S605: NO), the device as a general device transmits the monitoring packet to a device having an immediately higher priority than itself (higher-level device) (S630).

A device (higher-level device) receiving the monitoring packet executes the operation check packet reception process of FIG. 10 (explained above) as the event handler for this receive event, by which the device (higher-level device) transmits a reply indicating that it is in operation to the device having an immediately lower priority than itself (S705).

The device which transmitted the monitoring packet to the higher-level device checks whether a reply has been received from the higher-level device or not (S635). If a reply has been received from the higher-level device (S635: YES), the device recognizes that the higher-level device is in operation as before and ends the process of FIG. 9.

On the other hand, if no reply has been received from the higher-level device (S635: NO), the device recognizes that the higher-level device has stopped its operation and reports to the master device that the monitoring target device (higher-level device) is absent (S640).

Figure 11:
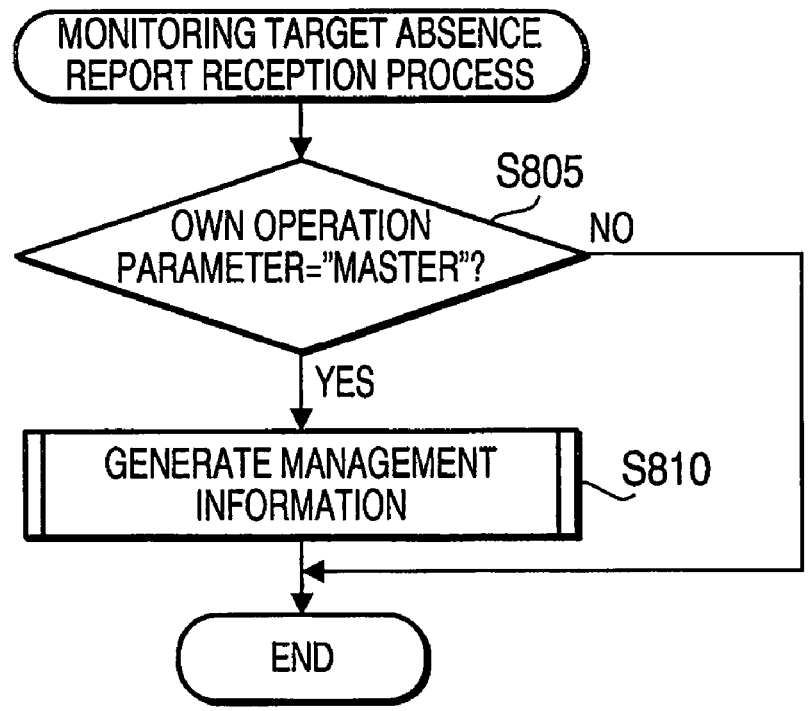
FIG. 11 is a flow chart showing a monitoring target absence report reception process in accordance with aspects of the present invention.

The device receiving the report executes a monitoring target absence report reception process shown in FIG. 11 as the event handler for this receive event. Specifically, at the start of the monitoring target absence report reception process, the device checks whether its own operation parameter is "master" or not (S805). If its own operation parameter is "master" (S805: YES), the device regenerates the management information by executing the management information generating process (S810). The step S810 is equivalent to the management information generating process of FIG. 6 (S305-S365) already explained above and thus repeated explanation thereof is omitted here. Since the management information is regenerated in the step S810, the higher-level device (suspected to have stopped its operation) is deleted from the management information if communication between the master device and the higher-level device is impossible. On the other hand, if its own operation parameter is not "master" (S805: NO), the device (general device) skips the step S810 and ends the monitoring target absence report reception process. Therefore, in the state for functioning as a general device, the device executes no substantial process in the monitoring target absence report reception process.

Figure 6:
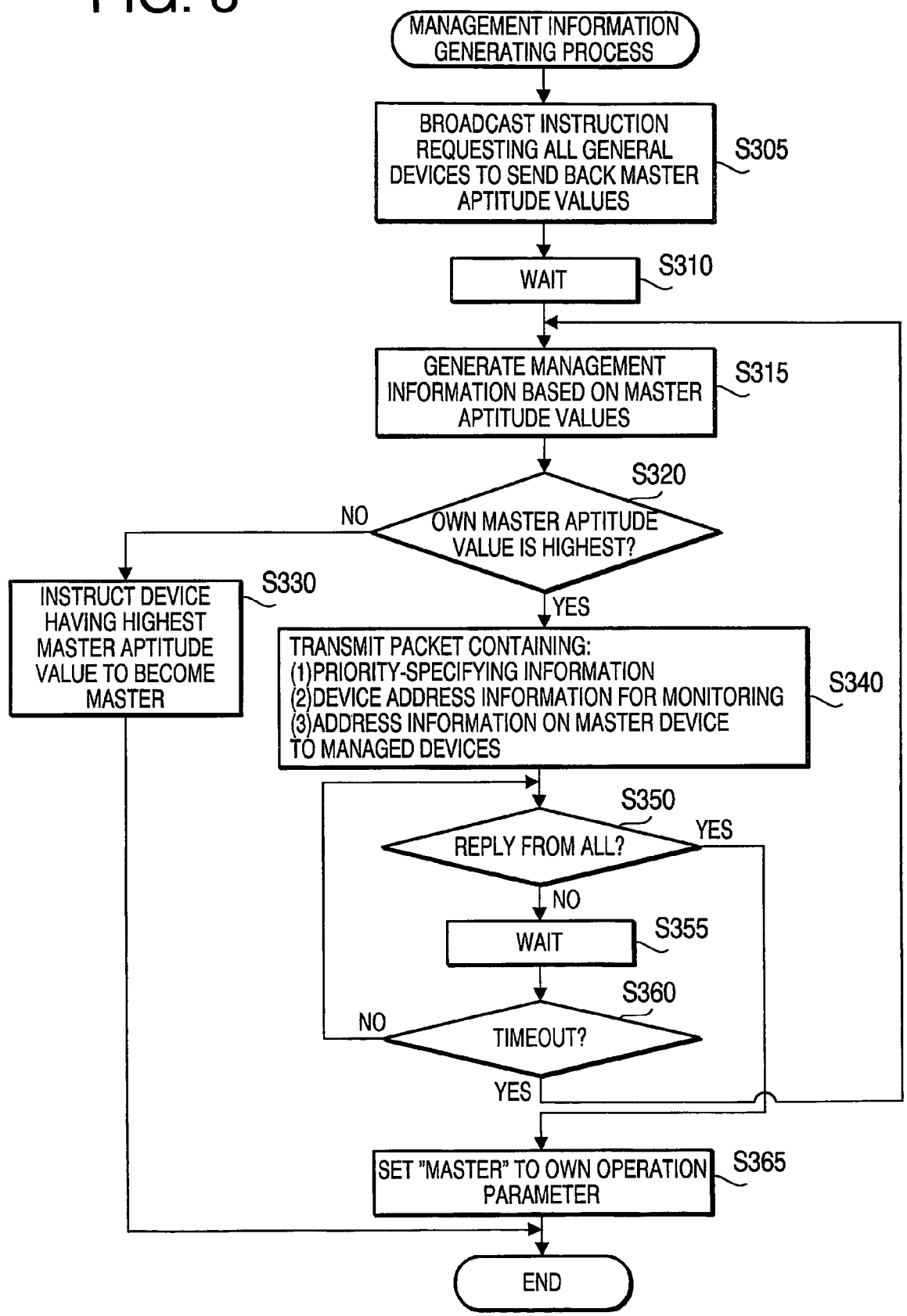
FIG. 6 is a flow chart showing a management information generating process in accordance with aspects of the present invention.

Incidentally, when the above monitoring target absence report reception process (including the management information generating process (S810) equivalent to that of FIG. 6 (S305-S365)) is executed by the master device, a reply of some kind is transmitted by the master device (S330 or S340).

Referring again to FIG. 9, the device which transmitted the report (S640) waits a prescribed time period (e.g. 1 second) (S645) and thereafter checks whether a reply from the master device has been received or not (S650). If no reply has been received (S650: NO), the device checks whether a timeout has occurred or not (S660) and returns to S645 if no timeout has occurred (S655: NO). The loop of S645-S655 is repeated until the reply is received from the master device or the timeout occurs.

When the reply is received from the master device during the repetition of the loop of S645-S655 (S650: YES), the process of FIG. 9 is ended.

On the other hand, when the timeout occurs (S655: YES), it means that no master device (for replying to the report) exists on the network. In this case, the device recognizing that the device itself should function as the master device generates the management information (S660) and ends the process of FIG. 9. The step S660 is equivalent to the management information generating process of FIG. 6 (S305-S365) and thus repeated explanation thereof is omitted here. Incidentally, since the device can not acquire the master data from the former master device in this case, the device regenerates the management information based on copy data of the master data previously obtained by the device or by another device.

The processes explained above are executed by the devices on the network (the image processing devices 3, 3, 5 and 5 in this embodiment), by which one of the devices functions as the master device, manages the other devices, and supplies the address book data (shared data to be shared by all the devices in the system) to the managed devices. The master device manages the priorities of all the managed devices and, when a device having a higher priority (higher master aptitude value) joins the network, the master device is replaced by the high-priority device.

Next, a process which is executed when the user performed an operation for updating the address book will be explained below referring to a flow chart of FIG. 12. The user can enter data for update by operating the operation keys (305, 505) of the master device or a general device. When the entered data is confirmed, the device starts the process shown in FIG. 12.

The device starting this process checks whether its own operation parameter is "master" or not (S1005). If its own operation parameter is "master" (S1005: YES), the device, functioning as the master device and storing the original of the master data of the address book data therein, executes an address book update process in order to update the original (S110). The details of the step S1010 will be explained in detail later. When the address book update process (S1010) is finished, the device ends the process of FIG. 12.

On the other hand, if its own operation parameter is not "master" (S1005: NO), the device, functioning as a general device and storing a copy of the master data of the address book data therein (not storing the original of the master data), transmits update data to the master device so that the original will be updated according to the update data (S1020) and ends the process of FIG. 12.

Figure 12:
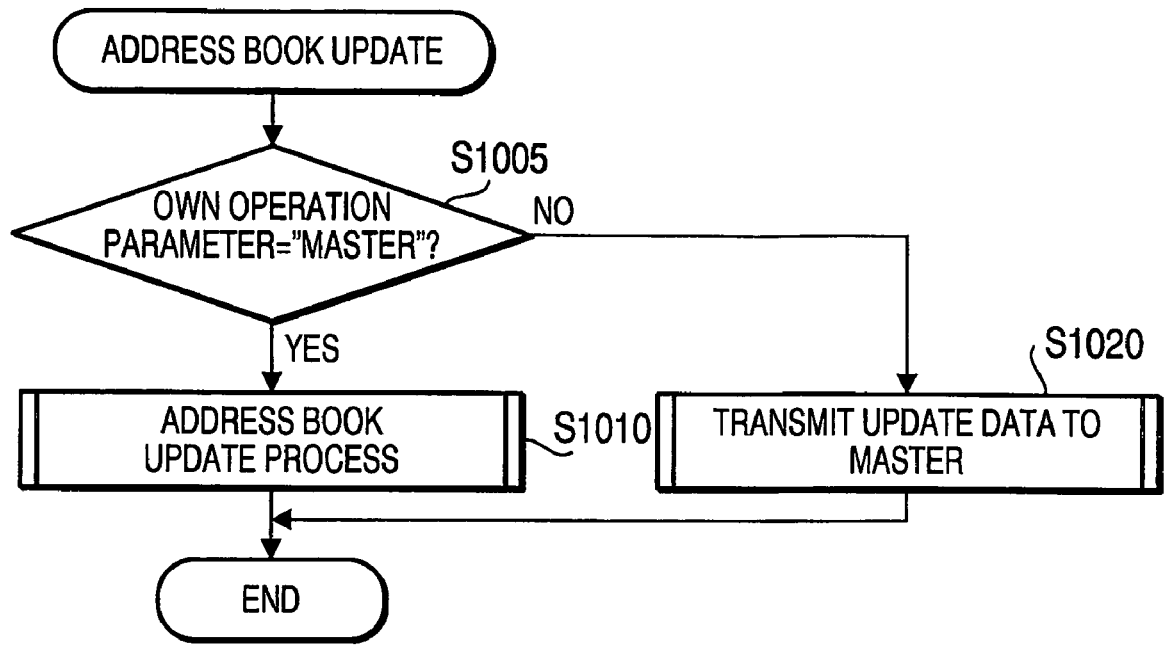
FIG. 12 is a flow chart showing a process executed when a user performed an operation for updating the address book in accordance with aspects of the present invention.
Figure 13:
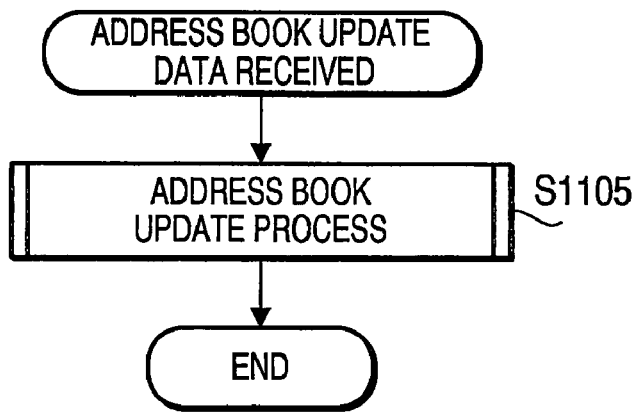
FIG. 13 is a flow chart showing a process executed when address book update data is received in accordance with aspects of the present invention.

The master device receiving the update data of S1020 executes a process shown in FIG. 13 as the event handler for this receive event, in which the master device executes an address book update process (S1105). The step S1105 is equivalent to the address book update process of S1010 of FIG. 12 (details will be explained later). When the address book update process (S1105) is finished, the master device ends the process of FIG. 13.

In short, the step S1010 is executed by the master device when the user of the master device performed an operation for updating the address book, while the step S105 is executed by the master device when the user of a general device performed an operation for updating the address book. In either case, the address book update process is executed by the master device.

Figure 14:
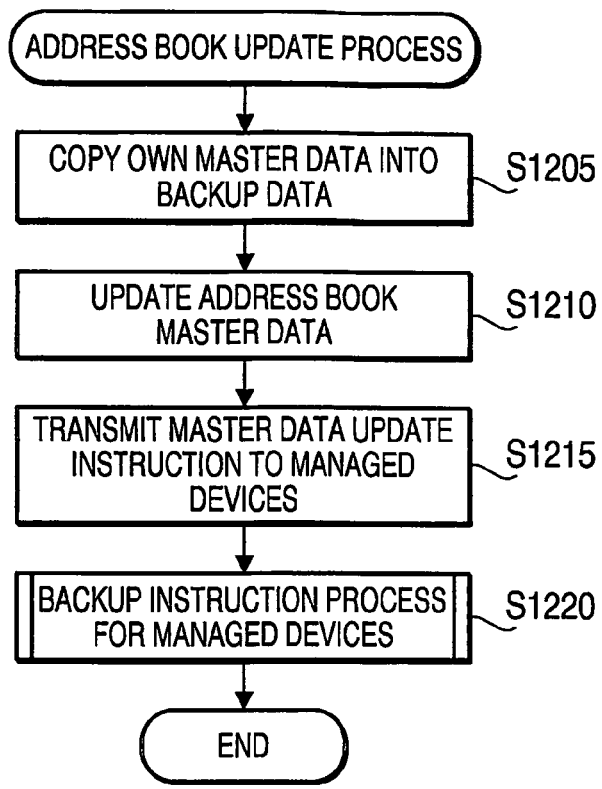
FIG. 14 is a flow chart showing an address book update process in accordance with aspects of the present invention.

Next, the address book update process (S1010, S1105) will be explained referring to a flow chart of FIG. 14.

At the start of the address book update process, the device (master device) copies its own master data into backup data (S1205). The backup data, as the copy of the master data (address book data) before the update, is stored in the non-volatile RAM (304, 504) in this embodiment.

After S1205 is finished, the device updates the master data (S1210), by which the master data is updated incorporating the latest update information. Subsequently, the device transmits a master data update instruction to the managed devices (S1215).

Figure 15:
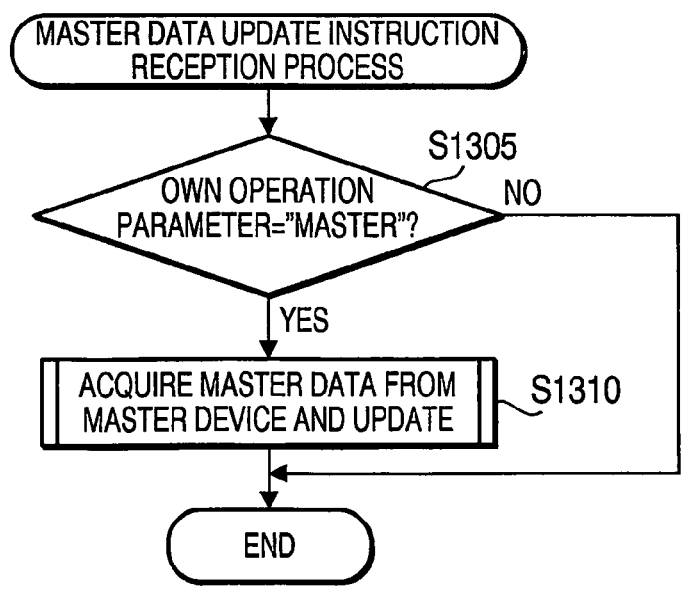
FIG. 15 is a flow chart showing a master data update instruction reception process in accordance with aspects of the present invention.

Each device (managed device) receiving the master data update instruction of S1215 executes a master data update instruction reception process shown in FIG. 15 as the event handler for this receive event. Specifically, the device starting the master data update instruction reception process checks whether its own operation parameter is "master" or not (S1305). If its own operation parameter is not "master" (S1305: NO), the device (general device) acquires the master data from the master device, updates its own master data (a copy of the original stored in the master device) to the acquired master data (S1310), and ends the master data update instruction reception process. On the other hand, if its own operation parameter is "master" (S1305: YES), the device (master device) skips the step S1310 and immediately ends the process. Therefore, in the state for functioning as the master device, the device executes no substantial process in the master data update instruction reception process.

Figure 16:
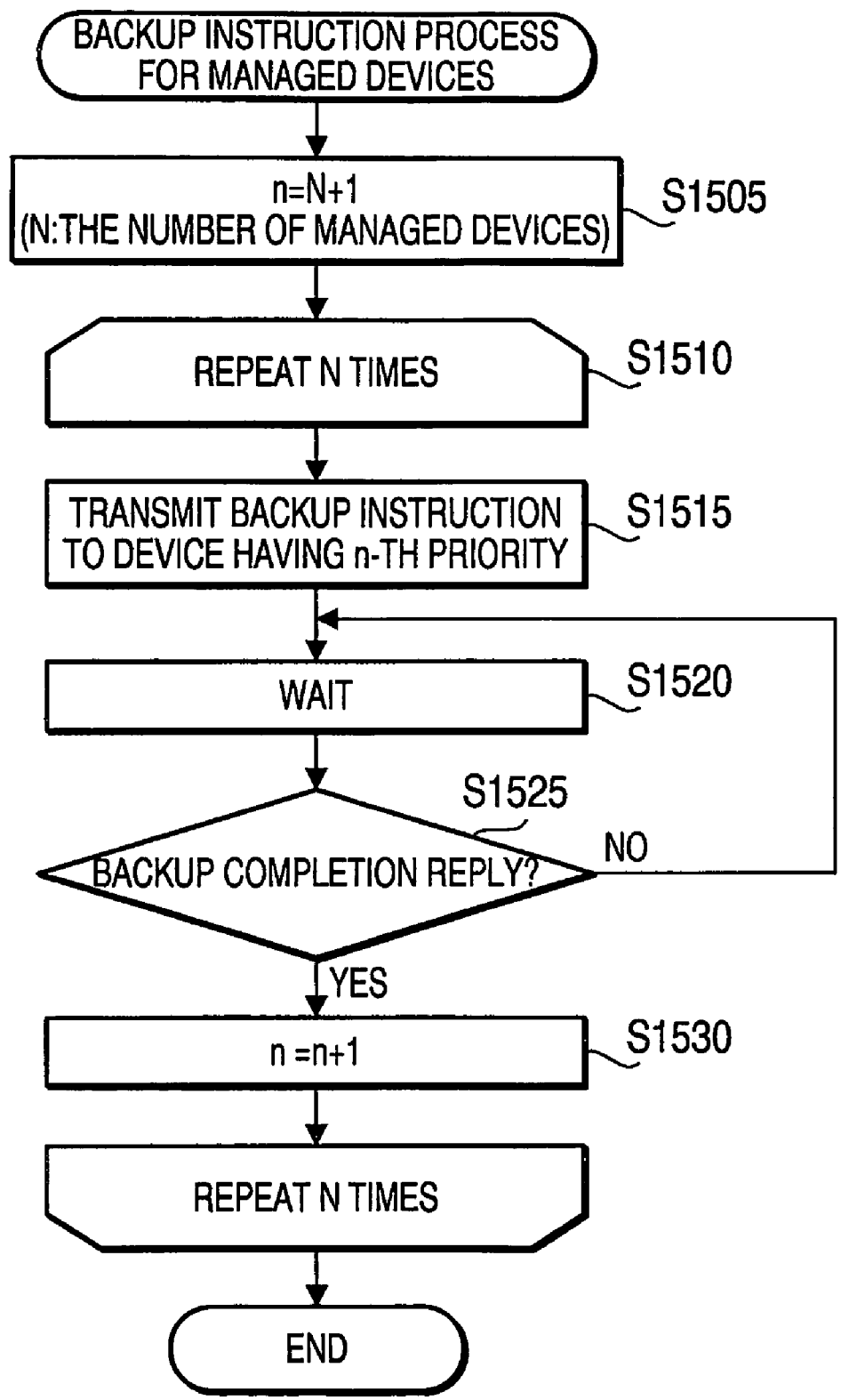
FIG. 16 is a flow chart showing a backup instruction process executed for managed devices in accordance with aspects of the present invention.

Referring again to FIG. 14, the device (master device) which finished the step S1215 executes a backup instruction process (S1220) for the managed devices. The details of the backup instruction process (S1220) are shown in FIG. 16. At the start of the backup instruction process, the device sets a counter variable n at N+1 (N: the number of managed devices) (S1505). For example, in the case where the system includes four devices (one master device and three general devices), the number of devices managed by the master device (the number of general devices) is three (N=3) and thus the counter variable n is set at 3+1=4. As above, the total number of devices including the master device and general devices is obtained by adding 1 (master device) to N (general devices), and the total number is set to the counter variable n.

Subsequently, the device (master device) repeats a loop of S1515-S1530 (which will be explained below) N times (S1510). In this loop, the device first transmits a backup instruction to a device having the n-th priority (S1515).

Figure 17:
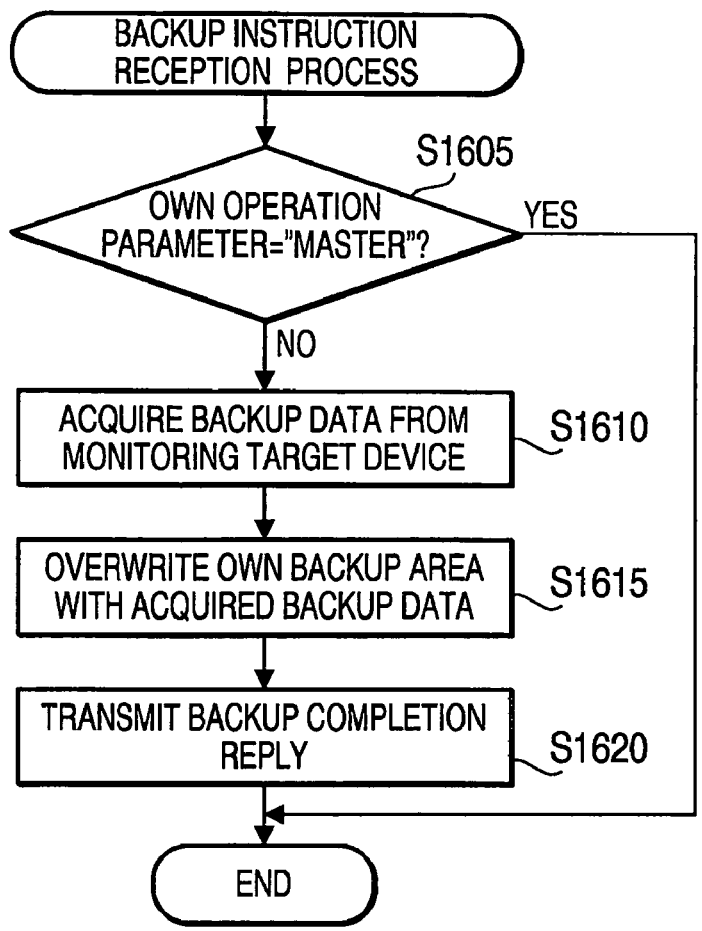
FIG. 17 is a flow chart showing a backup instruction reception process in accordance with aspects of the present invention.

The device receiving the backup instruction executes a backup instruction reception process shown in FIG. 17 as the event handler for this receive event. Specifically, the device receiving the backup instruction checks whether its own operation parameter is "master" or not (S1605). If its own operation parameter is not "master" (S1605: NO), the device (general device) acquires the backup data from the monitoring target device (a device having an immediately higher priority than itself) (S1610).

Figure 18:
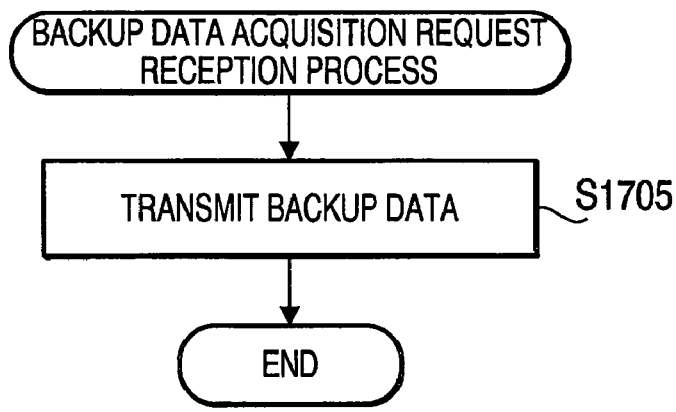
FIG. 18 is a flow chart showing a backup data acquisition request reception process in accordance with aspects of the present invention.

Specifically, in the step S1610, the device transmits a backup data acquisition request to the monitoring target device. The monitoring target device receiving the backup data acquisition request executes a backup data acquisition request reception process shown in FIG. 18 as the event handler for this receive event, in which the monitoring target device sends back its own backup data to the requesting device (S1705). The backup data sent in S1705 is acquired by the device in the step S1610.

The device which acquired the backup data (S1610) overwrites its own backup area with the acquired backup data (S1615), transmits a backup completion reply to the master device (S1620), and ends the backup instruction reception process. In the judgment of S1605, if its own operation parameter is "master" (S1605: YES), the device (master device) skips the steps S1610-S1620 and immediately ends the process. Therefore, in the state for functioning as the master device, the device executes no substantial process in the backup instruction reception process.

Since the backup completion reply (indicating that backup has been finished) is sent to the master device from the device of the n-th priority finishing the steps S1605-S1620, the master device finishing the step S1515 waits for the reply a prescribed time period (e.g. 1 second) (S1520) and thereafter checks whether the reply from the n-th priority device has been received or not (S1525). If no reply has been received (S1525: NO), the master device returns to S1520 and repeats the loop of S1520-S1525 until the reply is received from the n-th priority device.

When the reply is received from the n-th priority device during the repetition of the loop of S1520-S1525 (S1525: YES), the master device decrements the counter variable n by 1 (S1530). After repeating the above steps S1515-S1530 N times, the master device ends the backup instruction process.

In the steps S1505-S1530 explained above, the n-th priority device (device having the n-th priority) is a device in the ordinal rank represented by the counter variable n. The counter variable n is first set at the total number of devices in the system (initial value) and thereafter successively decremented by 1 (S1530) each time the loop of S1510-S1530 is repeated. For example, in the case where the system includes four devices including one master device and three general devices (with the counter variable n decreasing in the manner of 4, 3, 2 by the repetition), the backup instruction is first transmitted to a fourth priority device and thereafter to a third priority device and to a second priority device by the repetition of the step S1515. In short, the transmission of the backup instruction is repeated starting from a device having the lowest priority and thereafter raising the ordinal rank of the destination by one each time. Consequently, each general device stores a piece of backup data, in which newer backup data is stored in a device of higher priority.

Figure 19:
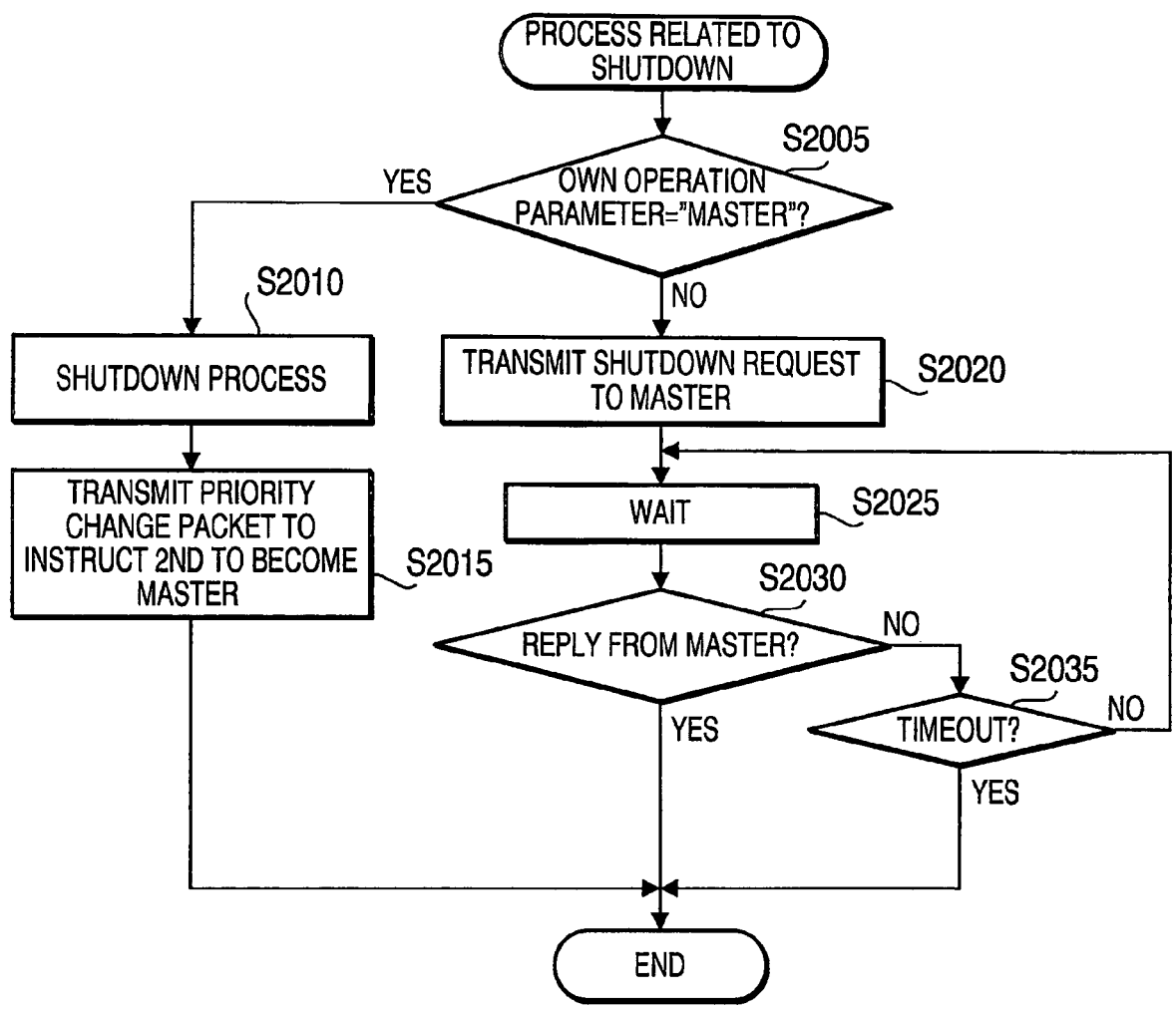
FIG. 19 is a flow chart showing a process executed when a device connected to the network disconnects from the network in accordance with aspects of the present invention.

Next, a process which is executed when a device connected to the network disconnects from the network (e.g. when the power switch is turned OFF) will be explained referring to a flow chart of FIG. 19.

Figure 20:
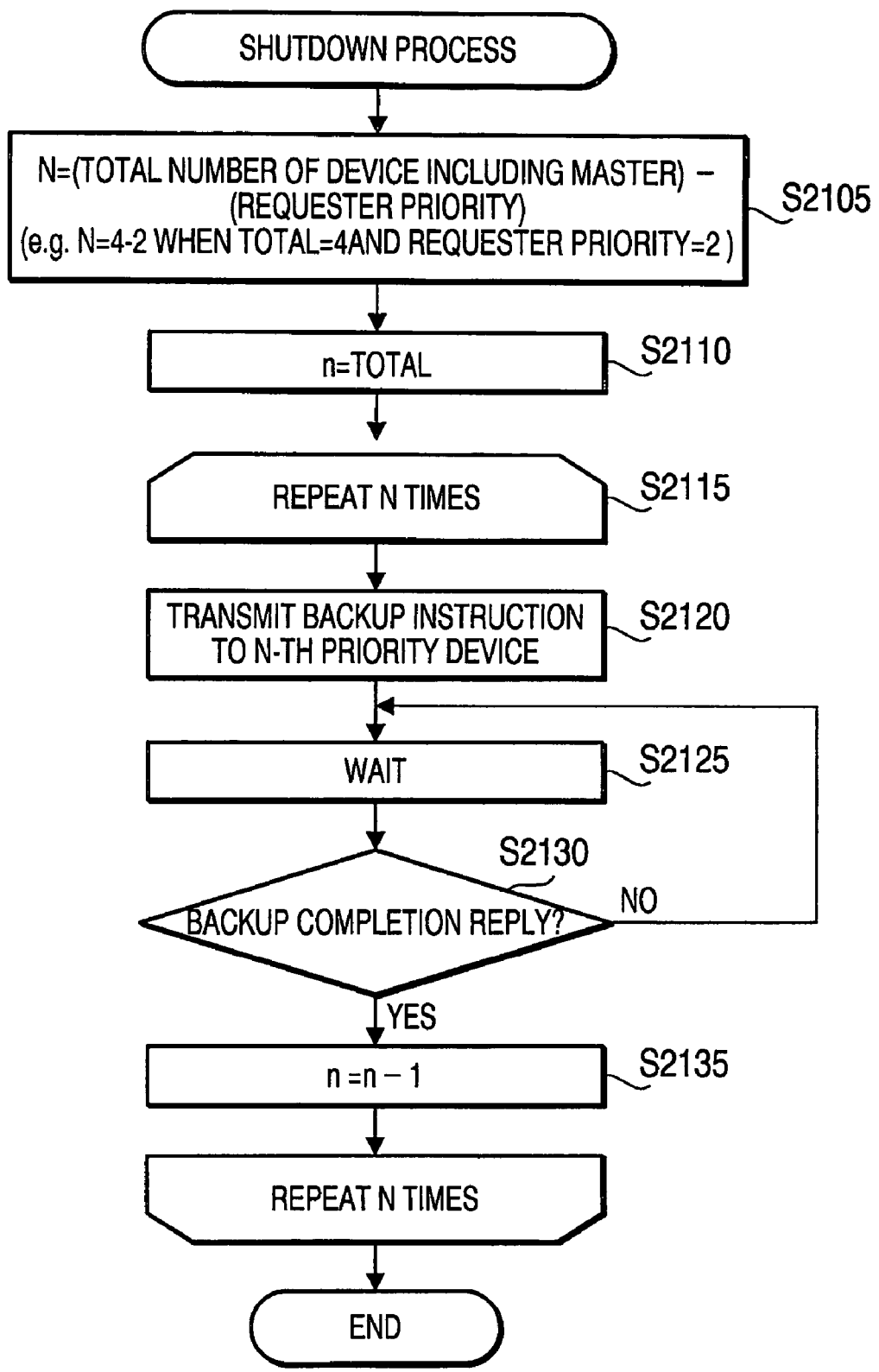
FIG. 20 is a flow chart showing a shutdown process in accordance with aspects of the present invention.

The device starting this process checks whether its own operation parameter is "master" or not (S2005). If its own operation parameter is "master" (S2005: YES), the device (master device) executes a shutdown process (S2010). The details of the shutdown process (S2010) are shown in FIG. 20.

At the start of the shutdown process of FIG. 20, the device figures out the number of repetitions (N) of a loop of S2120-S2135 which will be explained later (S2105). Specifically, the number N of repetitions is obtained by subtracting "the priority of a device requesting shutdown" from "the total number of devices including the master device and general devices". For example, in the case where the system includes four devices (one master device and three general devices), when a device of the second priority (i.e. a general device of the highest priority) is requesting shutdown, the number N of repetitions is obtained by subtracting 2 from 4 (N=4−2=2). When the device (master device) itself (i.e. the device of the first priority) is requesting shutdown, the number N of repetitions is obtained by subtracting 1 from 4 (N=4−1=3). The number N of repetitions obtained as above corresponds to the number of devices having lower priorities than the device requesting shutdown. Subsequently, the device (master device) sets a counter variable n at the total number of devices including the master device and general devices (S2110).

Thereafter, the device (master device) repeats the loop of S2120-S2135 (which will be explained below) N times (S2115).

In this loop, the device first transmits the backup instruction to a device having the n-th priority (S2120). The device receiving the backup instruction executes the backup instruction reception process of FIG. 17 as the event handler for this receive event. Since the details of the process of FIG. 17 have been explained above, repeated explanation thereof is omitted here.

Since the backup completion reply is sent to the master device from the n-th priority device finishing the backup, the master device finishing the step S2120 waits for the reply a prescribed time period (e.g. 1 second) (S2125) and thereafter checks whether the reply from the n-th priority device has been received or not (S2130). If no reply has been received (S2130: NO), the master device returns to S2125 and repeats the loop of S2125-S2130 until the reply is received from the n-th priority device.

When the reply is received from the n-th priority device during the repetition of the loop of S2125-S2130 (S2130: YES), the master device decrements the counter variable n by 1 (S2135). After repeating the above steps S2120-S2135 N times, the master device ends the shutdown process.

In the steps S2105-S2135 explained above, the n-th priority device (device having the n-th priority) is a device in the ordinal rank represented by the counter variable n. The counter variable n is first set at the total number of devices in the system (initial value) and thereafter successively decremented by 1 (S2135) each time the loop of S2125-S2130 is repeated. Incidentally, the number N of repetitions in the shutdown process of FIG. 20 corresponds to the number of devices having lower priorities than the device requesting shutdown. Therefore, the counter variable n is decreased by one at a time starting from a value corresponding to the lowest priority to "a value corresponding to a priority immediately lower than that of the device requesting shutdown". The backup instruction is transmitted to devices having such priorities in the steps S2105-S2135. In short, the backup instruction is transmitted to "all devices having lower priorities than the device requesting shutdown". The transfer of the backup data caused by such transmission of the backup instruction will be explained in detail later referring to timing charts.

After finishing the steps S2105-S2135 (S2010 in FIG. 19), the device (master device) transmits a priority change packet to a device having the second priority (general device having the highest priority) to instruct the device to become the master device (S2015) and ends the process of FIG. 12. The second priority device receiving the priority change packet executes the aforementioned priority change packet reception process (see FIG. 7).

On the other hand, if its own operation parameter is not "master" (S2005: NO), the device (general device) transmits a shutdown request to the master device (S2020).

Figure 21:
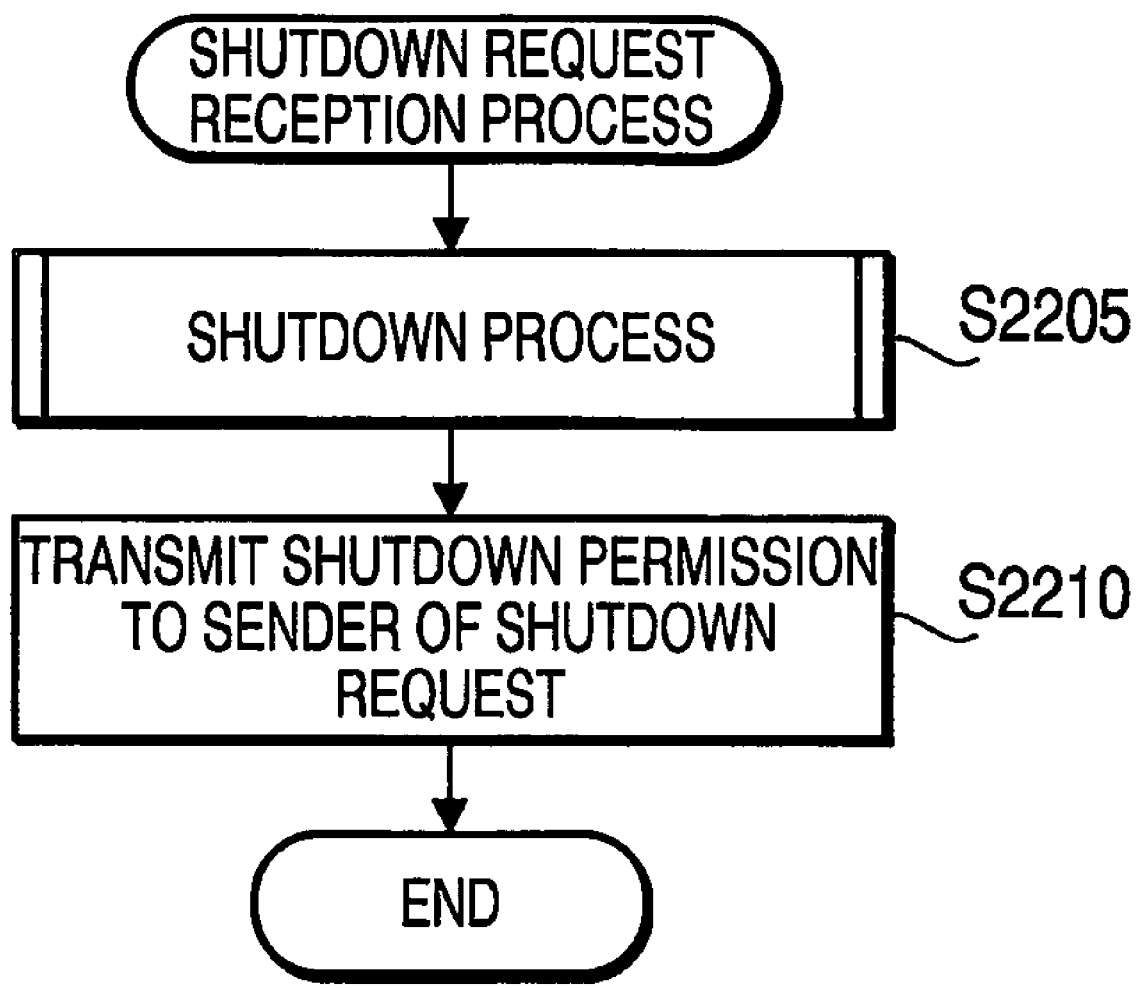
FIG. 21 is a flow chart showing a shutdown request reception process in accordance with aspects of the present invention.

The master device receiving the shutdown request executes a shutdown request reception process shown in FIG. 21 as the event handler for this receive event, in which the master device executes a shutdown process. The step S2205 is equivalent to the shutdown process of FIG. 20 (S2105-S2135) and thus repeated explanation thereof is omitted here. After finishing the step S2205, the master device transmits a shutdown permission to the sender of the shutdown request (S2210) and ends the shutdown request reception process.

Referring again to FIG. 19, the device (general device) which transmitted the shutdown request in S2020 waits a prescribed time period (e.g. 1 second) (S2025) and thereafter checks whether a reply from the master device has been received or not (S2030). If no reply has been received (S2030: NO), the device checks whether a timeout has occurred or not (S2035) and returns to S2025 if no timeout has occurred (S2035: NO). The loop of S2025-S2035 is repeated until the reply is received from the master device or the timeout occurs. When the reply is received from the master device during the repetition of the loop of S2025-S2035 (S2030: YES) or when the timeout occurs (S2035: YES), the device ends the process of FIG. 19. By the completion of this process (S2005-S2035), the device shifts into a state in which it can disconnect from the network. Thereafter, the device may automatically turn OFF the power switch or simply inform the user of the state in which the power switch can be turned OFF.

Figure 22:
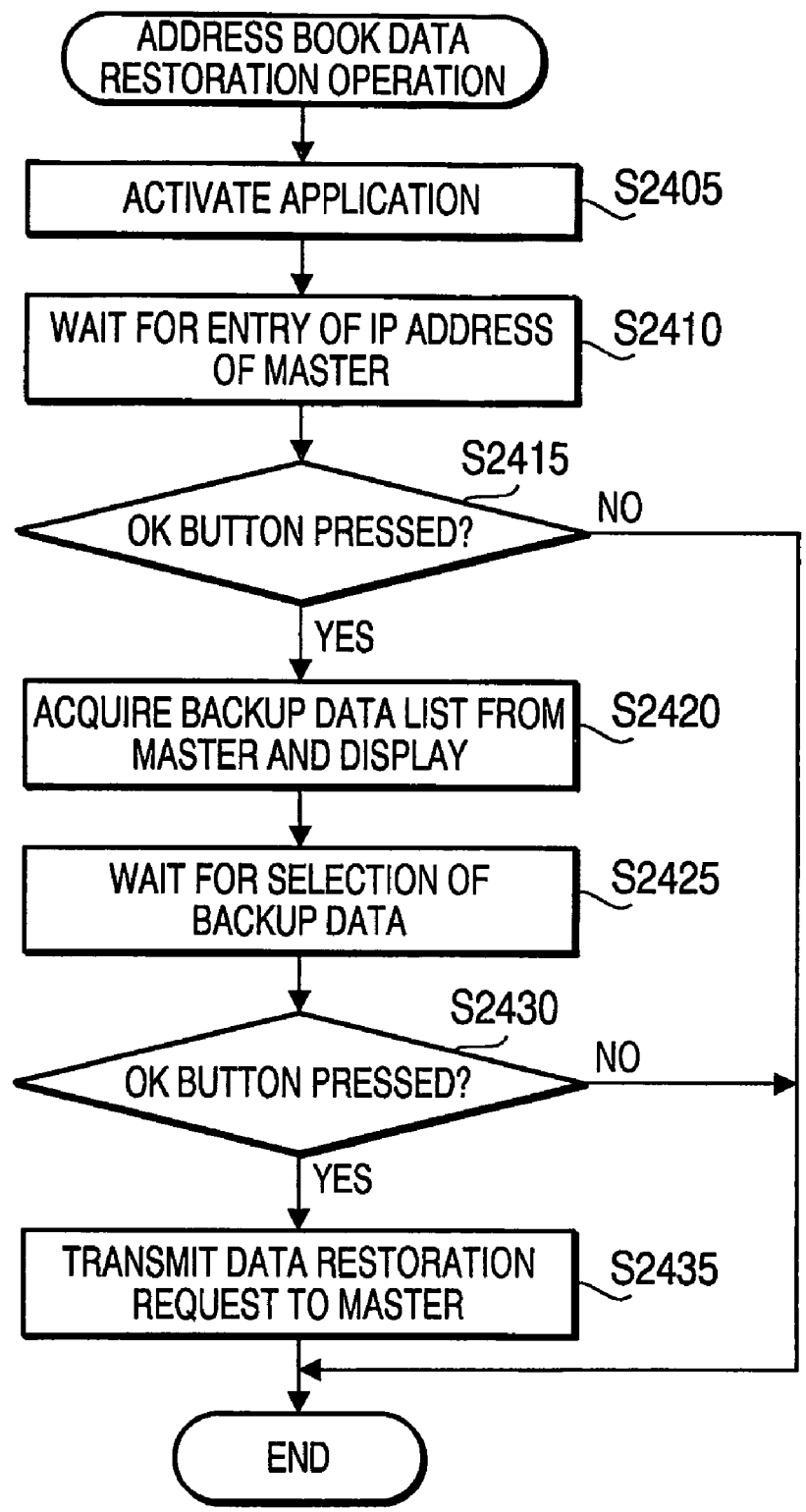
FIG. 22 is a flow chart showing a process executed by a PC of the network system for restoring updated address book data to that before the update by use of backup data in accordance with aspects of the present invention.

Next, a process executed by the PC 1 for restoring updated address book data to that before the update by use of the aforementioned backup data will be explained referring to a flow chart of FIG. 22. This process is executed when a prescribed operation (e.g. clicking an icon or menu item with the pointing device for activating a program) is performed by the user of the PC 1.

Figure 23A:
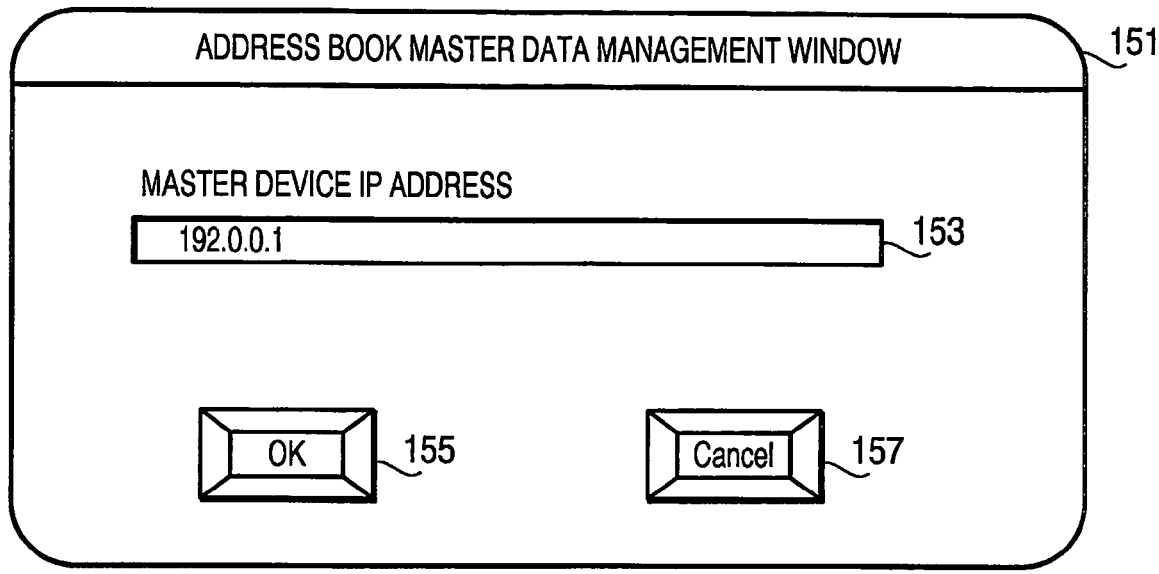
FIG. 23A is an explanatory drawing showing an address book master data management window displayed by the PC in accordance with aspects of the present invention.

The PC 1 starting this process activates an application (S2405) and thereby displays an address book master data management window 151 (see FIG. 23A) on the display unit 106 to wait for an entry of an IP address (S2410). In this state, the user can enter the IP address of the master device in a master device IP address entry box 153 of the address book master data management window 151 and press (click with the pointing device) an OK button 155 or a cancel button 157 in the window.

When an entry is made by the user, the PC 1 exits from S2410 and thereafter checks whether the OK button 155 has been pressed or not (S2415). If the OK button 155 has not been pressed (S2415: NO), the PC 1, judging that the cancel button 157 has been pressed or an not shown different operation has been performed, ends the process of FIG. 22.

Figure 23B:
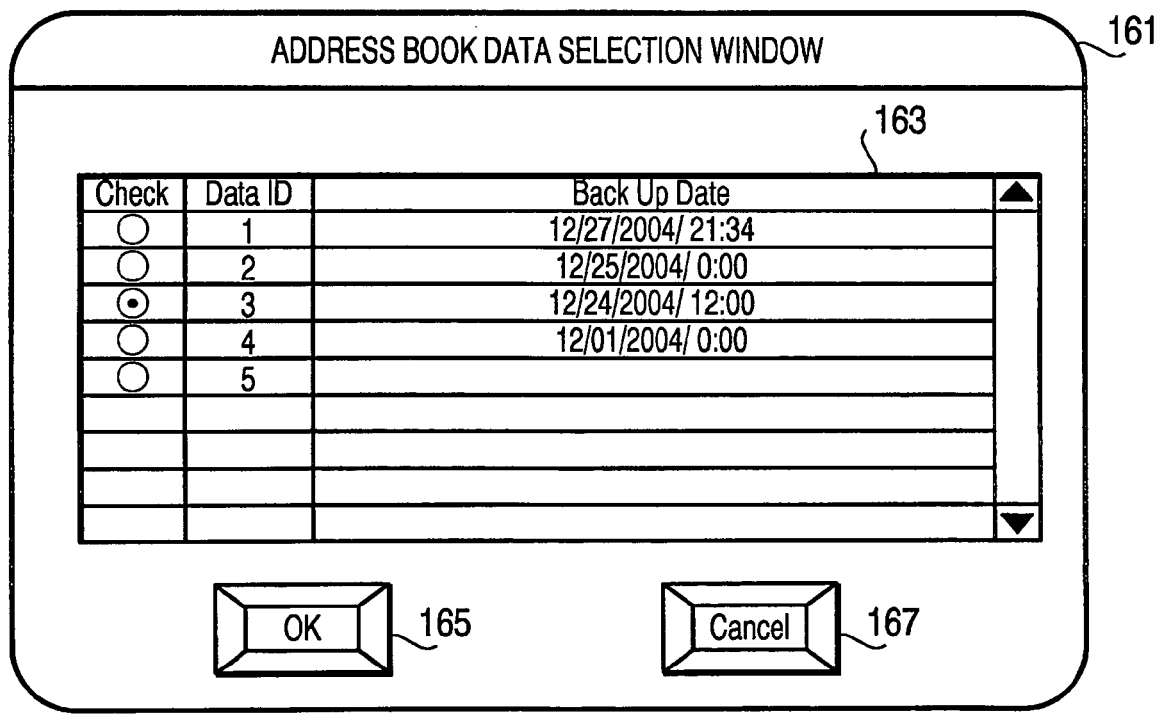
FIG. 23B is an explanatory drawing showing an address book data selection window displayed by the PC in accordance with aspects of the present invention.

If the OK button 155 has been pressed (S2415: YES), the PC 1 acquires a backup data list from the master device and displays the list (S2420). Specifically, the PC 1 displays an address book data selection window 161 (see FIG. 23B) on the display unit 106. In a list display area 163 in the address book data selection window 161, a list of selectable backup data is displayed together with their backup dates.

After displaying the address book data selection window 161, the PC 1 waits for a selection of backup data (S2425). In this state, the user can select one of the backup data displayed in the list display area 163 of the address book data selection window 161 and press an OK button 165 or a cancel button 167 in the window.

When a selection is made by the user, the PC 1 exits from S2425 and thereafter checks whether the OK button 165 has been pressed or not (S2430). If the OK button 165 has not been pressed (S2430: NO), the PC 1, judging that the cancel button 167 has been pressed or an not shown different operation has been performed, ends the process of FIG. 22.

If the OK button 165 has been pressed (S2430: YES), the PC 1 transmits a data restoration request to the master device (S2435) and ends the process of FIG. 22. The master device receiving the data restoration request executes a process corresponding to the data restoration request.

Next, the process which is executed by the device receiving the data restoration request of S2435 as the event handler for this receive event will be explained referring to a flow chart of FIG. 24.

The device starting this process checks whether its own operation parameter is "master" or not (S2605). If its own operation parameter is not "master" (S2605: NO), the device immediately ends the process. Therefore, in the state for functioning as a general device, the device executes no substantial process in the process of FIG. 24.

On the other hand, if its own operation parameter is "master" (S2605: YES), the device (master device) judges whether or not the backup data specified by the user exists in the device itself (S2610). As explained before, the "backup data" in this embodiment include multiple pieces of backup data accumulated in a storage area of the master device and multiple pieces of backup data each of which is stored respectively in a storage area of each of the general devices. When the latest backup data is generated, the same backup data is stored both in the storage area of the master device and in the storage area of a general device having the highest priority. However, there are cases where the backup data exists in the master device only or in another device only due to power off or shortage of remaining storage capacity of a device.

Therefore, when the specified backup data is judged to exist in itself (S2610: YES), the master device obtains the backup data from its own storage area (S2615). When the specified backup data is not judged to exist in itself (S2610: NO), the master device checks the location of the backup data and obtains the backup data from a managed device (S2620).

Figure 24:
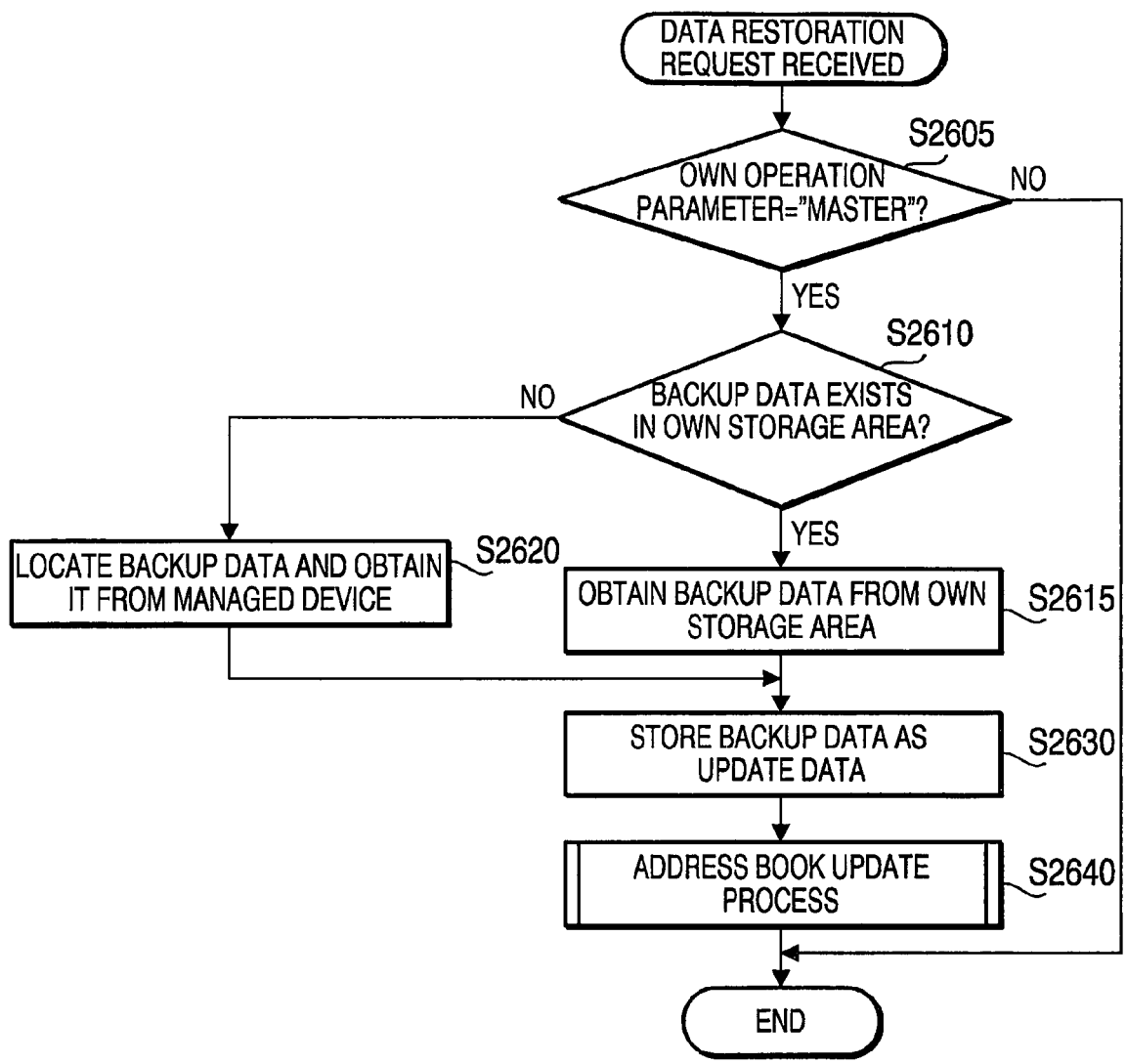
FIG. 24 is a flow chart showing a process executed by a device receiving data restoration request in accordance with aspects of the present invention.

After obtaining the backup data from itself or another device, the master device stores the obtained backup data as update data (S2630), executes the address book update process (S2640), and ends the process of FIG. 24. The step S2640 is equivalent to the address book update process of FIG. 14 (S1205-S1220) and thus repeated explanation thereof is omitted here.

Concrete Example #1 of Operation of Network System

In the following, some examples of the operation of the network system implemented by the above processes will be explained in detail. In the following explanation, devices in accordance with the present invention (image processing devices 3, 3, 5 and 5 in this embodiment) will be referred to as "devices 1, 2, 3 and 4" in order to avoid the complexity of the explanation.

First, a concrete example #1 will be explained.

Figure 25:
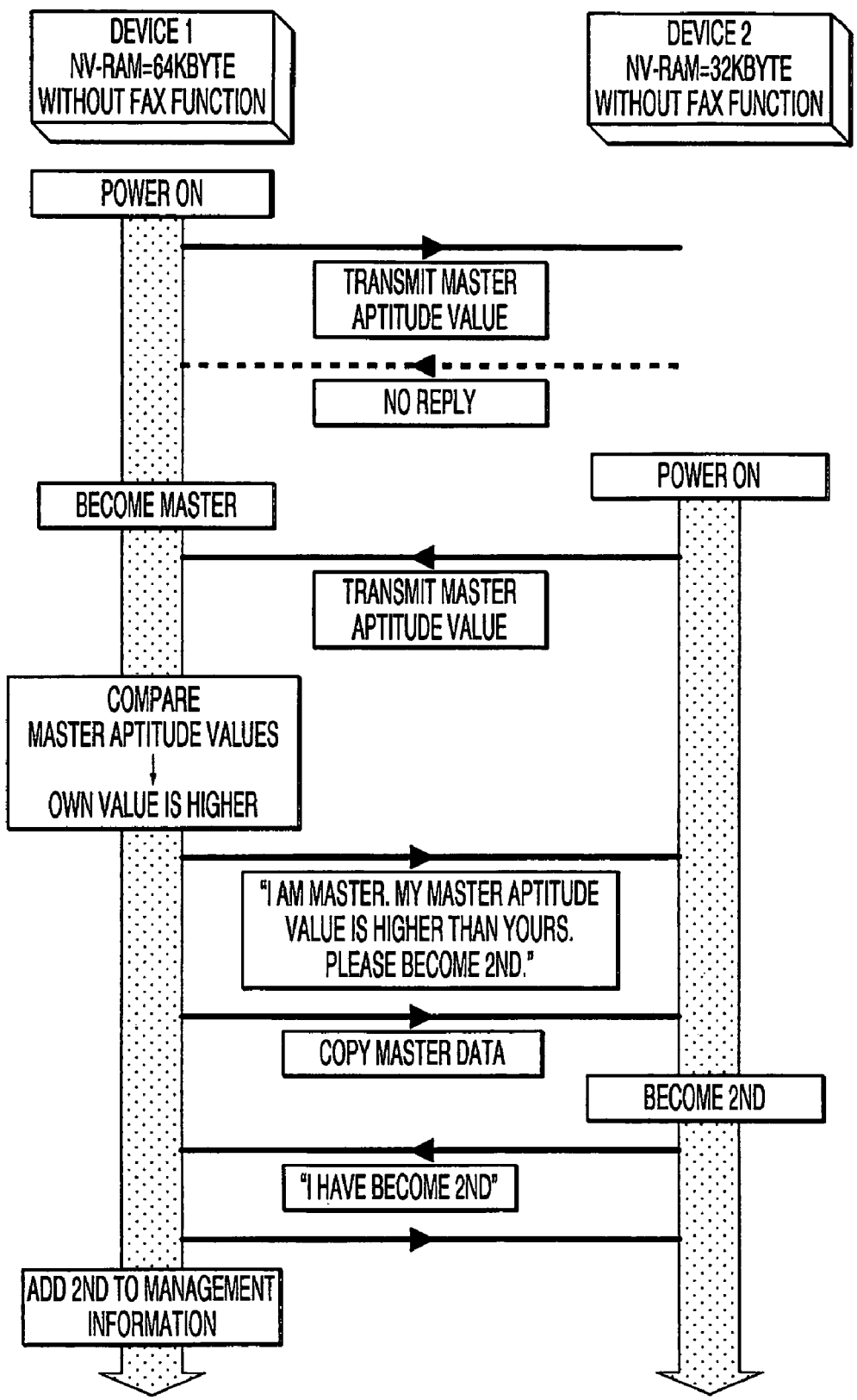
FIG. 25 is a timing chart showing a concrete example #1 of the operation of the network system in accordance with aspects of the present invention.

FIG. 25 is a timing chart showing how the priority is determined and the master data is supplied to a device 2 that is newly connected to a network system including a device 1 functioning as the master device.

In the concrete example #1, the master aptitude value of the device 1 is 64 (nonvolatile RAM capacity=64, continuous operability index=1 (without the FAX function)) and that of the device 2 is 32 (nonvolatile RAM capacity=32, continuous operability index=1 (without the FAX function)).

When the power of the device 1 is turned ON first, the device 1 transmits (broadcasts) its own master aptitude value. Since no reply is returned from the network in response to the master aptitude value, the device 1 functions as the master device.

Thereafter, when another device 2 is turned ON, the device 2 transmits (broadcasts) its own master aptitude value. The device 1 receiving the master aptitude value makes the comparison of the master aptitude values. In this case, the device 1 judges that its own master aptitude value (=64) is higher than that of the device 2 (=32).

Consequently, the device 1 sends a message saying "I am the master device. My master aptitude value is higher than yours. Please become the second priority device." to the device 2. Further, the master data (address book data) stored in the device 1 (master device) is copied to the device 2. The device 2 becomes the second priority device and returns a message saying "I have become the second priority device." to the device 1. The device 1 receiving the message adds the second priority device to the management information.

Concrete Example #2 of Operation of Network System

Next, a concrete example #2 will be explained.

Figure 26:
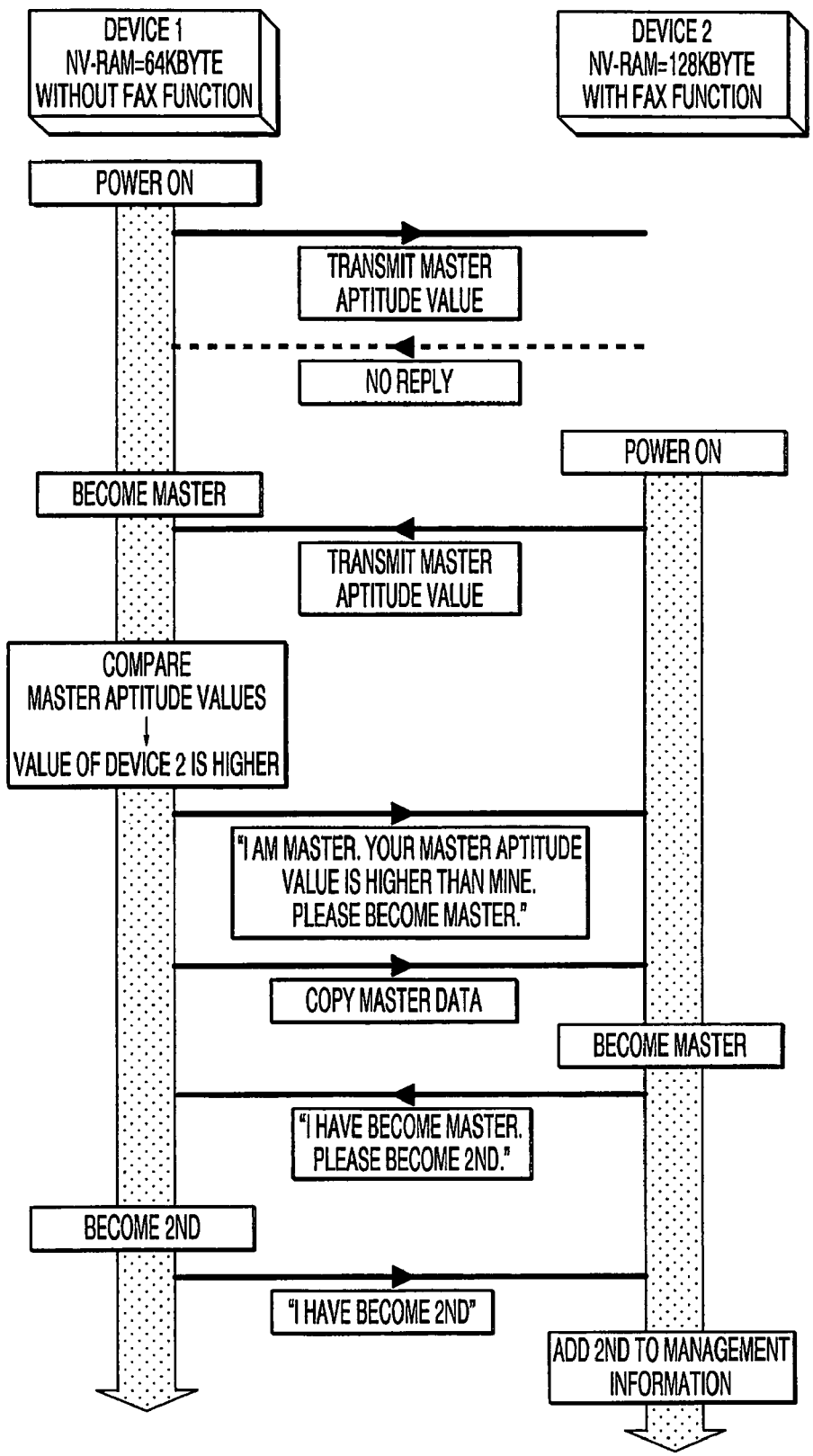
FIG. 26 is a timing chart showing a concrete example #2 of the operation of the network system in accordance with aspects of the present invention.

FIG. 26 is a timing chart also showing how the priority is determined and the master data is supplied to a device 2 that is newly connected to a network system including a device 1 functioning as the master device.

In the concrete example #2, the master aptitude value of the device 1 is 64 (nonvolatile RAM capacity=64, continuous operability index=1 (without the FAX function)) and that of the device 2 is 256 (nonvolatile RAM capacity=128, continuous operability index=2 (with the FAX function)), differently from the concrete example #1. In short, the device 2 joining the network later has a higher master aptitude value.

When the power of the device 1 is turned ON first, the device 1 transmits (broadcasts) its own master aptitude value. Since no reply is returned from the network in response to the master aptitude value, the device 1 functions as the master device.

Thereafter, when another device 2 is turned ON, the device 2 transmits (broadcasts) its own master aptitude value. The device 1 receiving the master aptitude value makes the comparison of the master aptitude values. In this case, the device 1 judges that the master aptitude value of the device 2 (=256) is higher than that of itself (=64).

Consequently, the device 1 sends a message saying "I am the master device. Your master aptitude value is higher than mine. Please become the master device." to the device 2. Further, the master data (address book data) stored in the device 1 (master device) is copied to the device 2. The device 2 becomes the master device (device having the first priority) and returns a message saying "I have become the master device. Please become the second priority device." to the device 1. The device 1 receiving the message becomes the second priority device and returns a message saying "I have become the second priority device." to the device 2. The device 2 adds the second priority device to the management information.

As above, when a device having a higher priority joins the network later, replacement of the master device occurs according to the priorities of the devices.

Concrete Example #3 of Operation of Network System

Next, a concrete example #3 will be explained.

Figure 27:
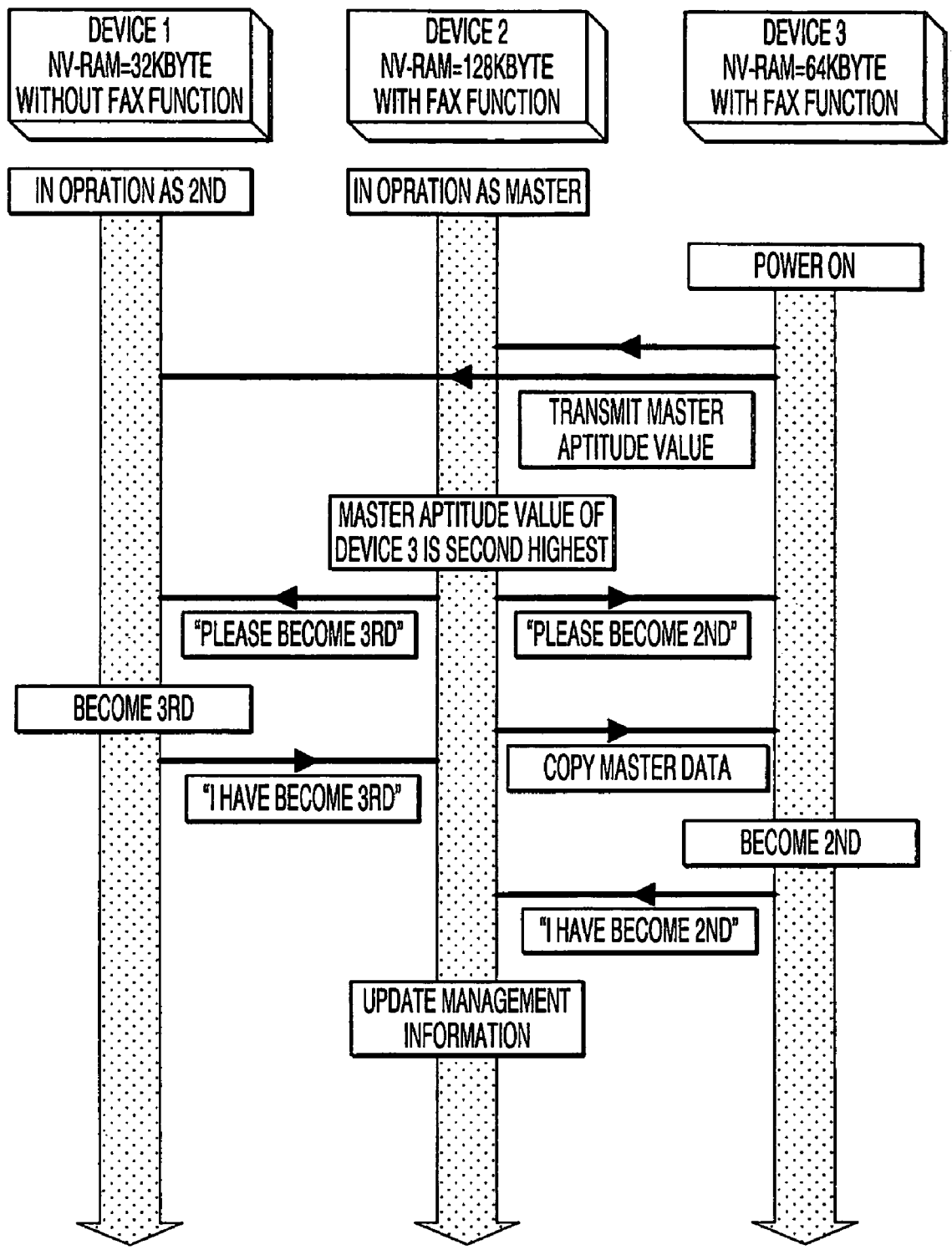
FIG. 27 is a timing chart showing a concrete example #3 of the operation of the network system in accordance with aspects of the present invention.

FIG. 27 is a timing chart showing a case where a device 3 is newly connected to a network system including two devices 1 and 2 already in operation on the network.

In the concrete example #3, the master aptitude value of the device 1 is 32 (nonvolatile RAM capacity=32, continuous operability index=1 (without the FAX function)), that of the device 2 is 256 (nonvolatile RAM capacity=128, continuous operability index=2 (with the FAX function)), and that of the device 3 is 128 (nonvolatile RAM capacity=64, continuous operability index=2 (with the FAX function)).

When the power of the device 3 is turned ON, the device 3 transmits (broadcasts) its own master aptitude value. The device 2 (master device) receiving the master aptitude value makes the comparison of the master aptitude values. In this case where the master aptitude values of the devices 1, 2 and 3 are 32, 256 and 128, the device 2 judges that its own master aptitude value (=256) is the highest, while judging that the devices 3 and 1 are of the second and third priorities, respectively.

Consequently, the device 2 sends a message saying "Please become the second priority device." to the device 3 while transmitting a message saying "Please become the third priority device." to the device 1. Further, the master data (address book data) stored in the device 2 (master device) is copied to the device 3.

The device 3 becomes the second priority device and returns a message saying "I have become the second priority device." to the device 2. Meanwhile, the device 1 becomes the third priority device and returns a message saying "I have become the third priority device." to the device 2. The device 2 receiving the messages updates the management information accordingly.

As above, when a device having a higher priority joins the network later, a change in ordinal ranks occurs even among general devices according to the priorities of the devices.

Concrete Example #4 of Operation of Network System

Next, a concrete example #4 will be explained.

Figure 28:
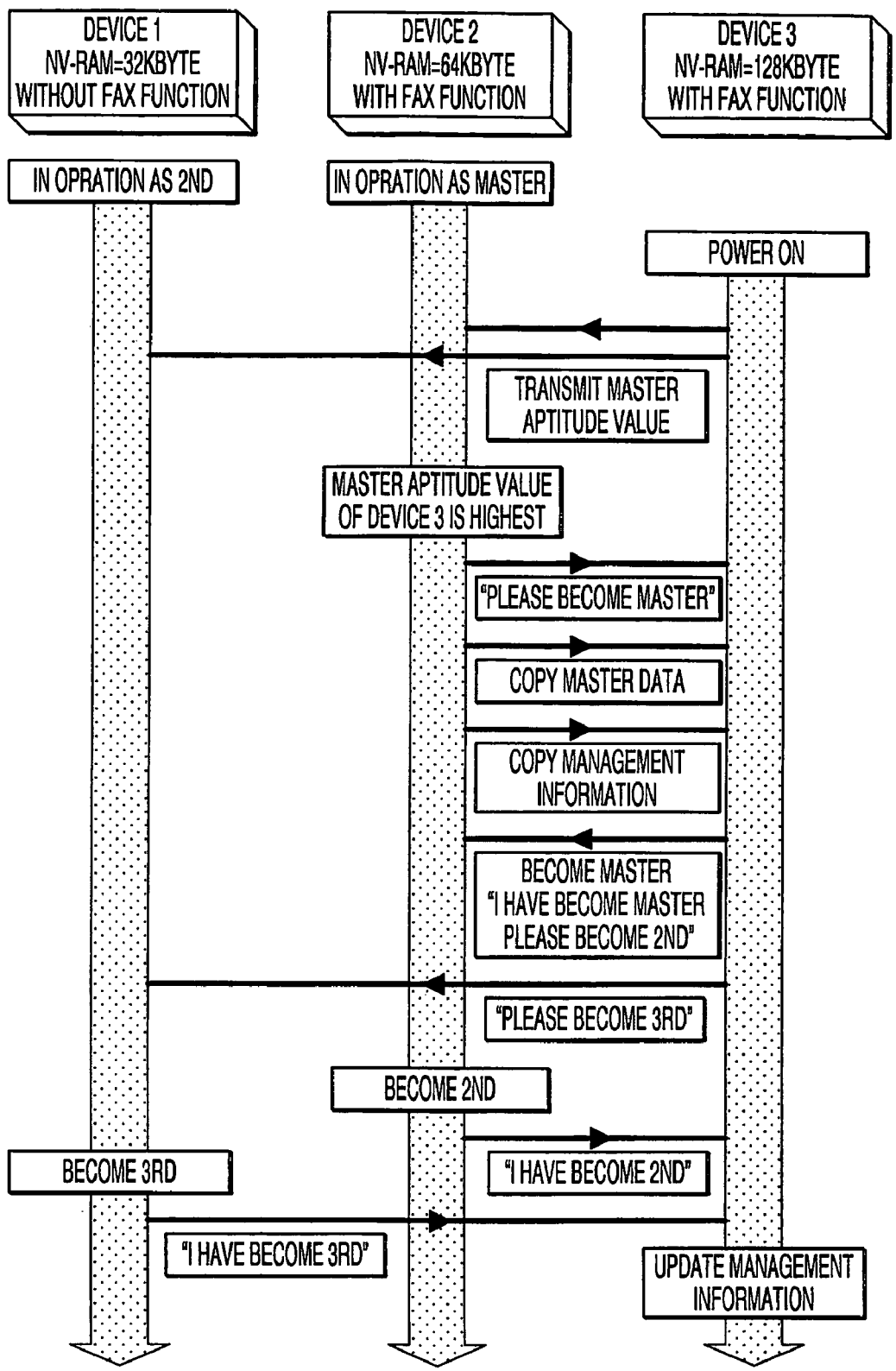
FIG. 28 is a timing chart showing a concrete example #4 of the operation of the network system in accordance with aspects of the present invention.

FIG. 28 is a timing chart also showing a case where a device 3 is newly connected to a network system including two devices 1 and 2 already in operation on the network.

In the concrete example #4, the master aptitude value of the device 1 is 32 (nonvolatile RAM capacity=32, continuous operability index=1 (without the FAX function)), that of the device 2 is 128 (nonvolatile RAM capacity=64, continuous operability index=2 (with the FAX function)), and that of the device 3 is 256 (nonvolatile RAM capacity=128, continuous operability index=2 (with the FAX function)).

When the power of the device 3 is turned ON, the device 3 transmits (broadcasts) its own master aptitude value. The device 2 (master device) receiving the master aptitude value makes the comparison of the master aptitude values. In this case where the master aptitude values of the devices 1, 2 and 3 are 32, 128 and 256, the device 2 judges that the device 3 has the highest master aptitude value (=256).

Consequently, the device 2 sends a message saying "Please become the master device." to the device 3. Further, the master data (address book data) and the management information stored in the device 2 (master device) are copied to the device 3.

Subsequently, the device 3 returns a message saying "I have become the master device. Please become the second priority device." to the device 2, while transmitting a message saying "Please become the third priority device." to the device 1. In response to the message, the device 2 becomes the second priority device and returns a message saying "I have become the second priority device." to the device 3. Meanwhile, the device 1 becomes the third priority device and returns a message saying "I have become the third priority device." to the device 3. The device 3 receiving the messages updates the management information accordingly.

As above, when a device having the highest priority joins the network including a plurality of devices in operation, replacement of the master device occurs and thereafter reassignment of ordinal ranks of general devices is carried out according to the priorities of the devices.

Concrete Example #5 of Operation of Network System

Next, a concrete example #5 will be explained.

Figure 29:
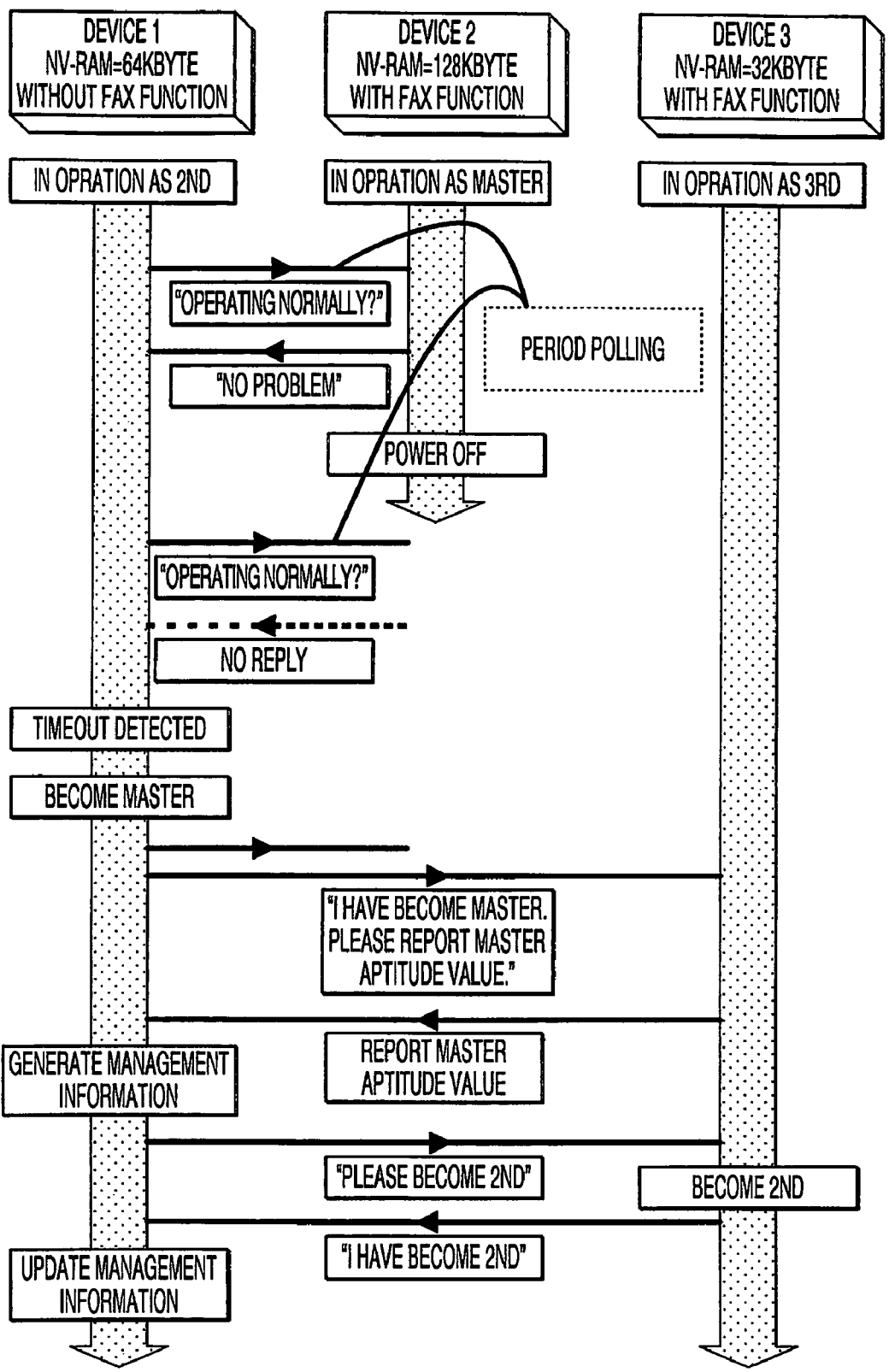
FIG. 29 is a timing chart showing a concrete example #5 of the operation of the network system in accordance with aspects of the present invention.

FIG. 29 is a timing chart also showing a case where the power of a device 2 is suddenly turned OFF when three devices 1, 2, and 3 are in operation on the network.

In the concrete example #5, the master aptitude value of the device 1 is 128 (nonvolatile RAM capacity=128, continuous operability index=1 (without the FAX function)), that of the device 2 is 256 (nonvolatile RAM capacity=128, continuous operability index=2 (with the FAX function)), and that of the device 3 is 64 (nonvolatile RAM capacity=32, continuous operability index=2 (with the FAX function)).

When all the devices 1, 2 and 3 are in operation, the device 1 (as a general device having the highest priority) periodically transmits a polling message saying "Operating normally?" to the device 2 as the master device and receives a reply saying "No problem." from the device 2, by which the device 1 monitors the presence of the master device.

When the power of the master device 2 is suddenly turned OFF, no reply to the polling message from the device 1 is returned from the device 2. In this case, the device 1 starts functioning as the master device at the point when a timeout is detected, and transmits (broadcasts) a request saying "I have become the master device. Please report your master aptitude value." to all the devices.

The device 3 receiving the request reports its own master aptitude value to the device 1. The device 1 generates the management information based on the reported master aptitude value. According to the ordinal ranks in the generated management information, the device 1 transmits a message saying "Please become the second priority device." to the device 3. The device 3 receiving the message becomes the second priority device and returns a message saying "I have become the second priority device." to the device 1.

As above, when the master device suddenly becomes absent, a device having the next highest priority detects the absence of the master device and shifts into a state for functioning as the master device, by which the period with no master device in the system can be ended immediately.

Concrete Example #6 of Operation of Network System

Next, a concrete example #6 will be explained.

Figure 30:
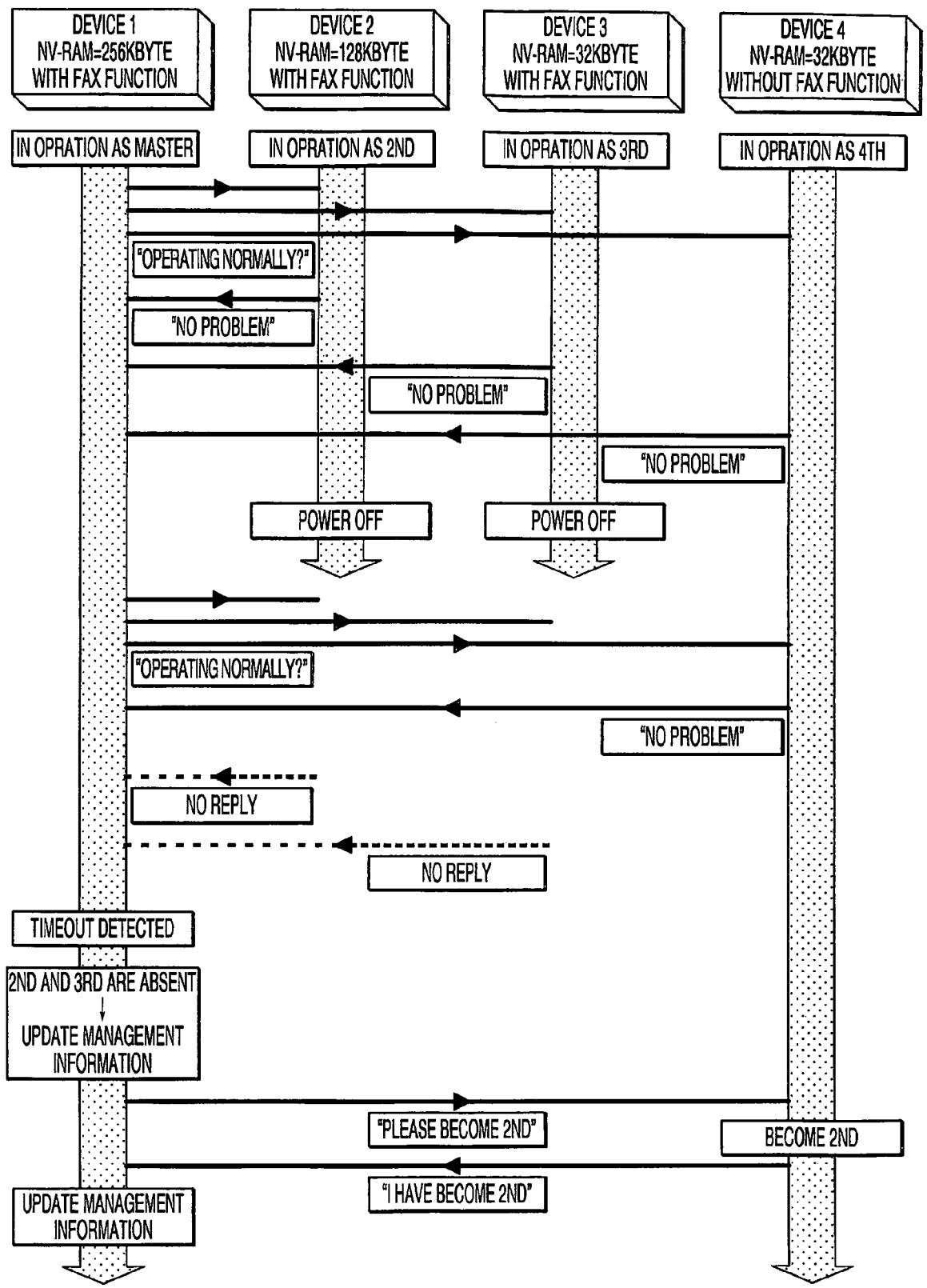
FIG. 30 is a timing chart showing a concrete example #6 of the operation of the network system in accordance with aspects of the present invention.

FIG. 30 is a timing chart showing a case where devices 2 and 3 having the second and third priorities are suddenly turned OFF when four devices 1, 2, 3 and 4 are in operation on the network.

In the concrete example #6, the master aptitude values of the devices 1, 2, 3 and 4 are 512, 256, 64 and 32, respectively.

When all the devices 1, 2, 3 and 4 are in operation, the device 1 having the highest priority (master device) periodically transmits a polling message saying "Operating normally?" to all the general devices 2, 3 and 4 and receives replies saying "No problem." from the devices 2, 3 and 4, by which the device 1 monitors the presence of the general devices.

When the devices 2 and 3 are suddenly turned OFF, no reply to the polling message from the device 1 is returned from the device 2 or 3. In this case, the device 1 recognizes that the devices 2 and 3 are absent at the point when a timeout is detected, and updates the management information. According to the ordinal ranks in the updated management information, the device 1 transmits a message saying "Please become the second priority device." to the device 4. The device 4 receiving the message becomes the second priority device and returns a message saying "I have become the second priority device." to the device 1.

As above, when two or more general devices suddenly become absent, the management information is updated and the priorities are reassigned.

Concrete Example #7 of Operation of Network System

Next, a concrete example #7 will be explained.

Figure 31:
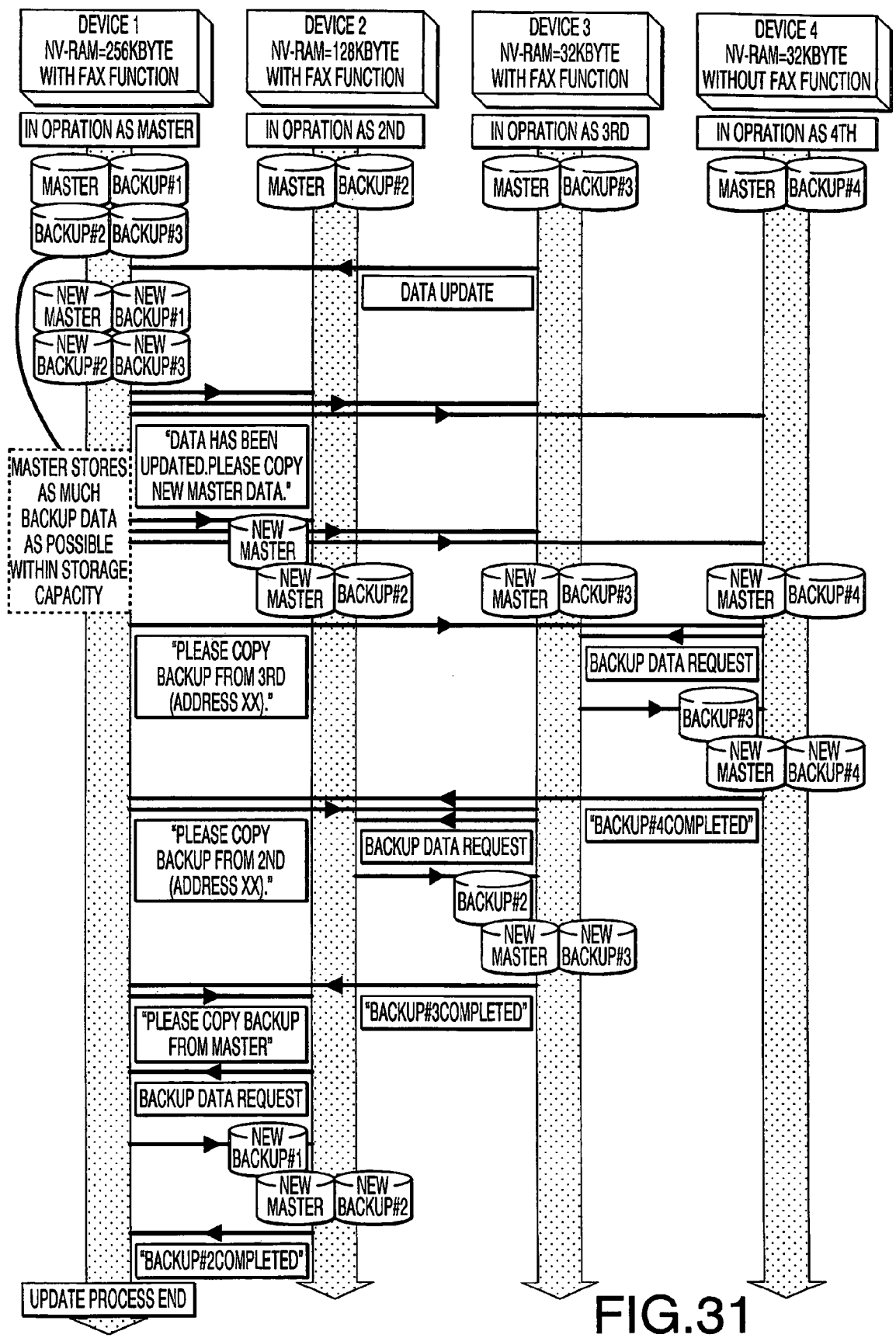
FIG. 31 is a timing chart showing a concrete example #7 of the operation of the network system in accordance with aspects of the present invention.

FIG. 31 is a timing chart showing a case where the address book data is updated in the device 3 when four devices 1, 2, 3 and 4 are in operation on the network.

In the concrete example #7, the master aptitude values of the devices 1, 2, 3 and 4 are 512, 256, 64 and 32, respectively.

When the address book data is updated in the device 3, the device 3 transmits a data update request to the master device 1. The master device 1 receiving the data update request updates its own address book data (master data). The master device has been configured to store as much backup data as possible (within its storage capacity) in itself. In the example of FIG. 31, the master device 1 is capable of storing three backup data files. Therefore, the master device 1 deletes the oldest backup data #3, renames the former backup data #2 as (new) "backup data #3", renames the former backup data #1 as (new) "backup data #2", renames the former master data as (new) "backup data #1", and regards the updated master data as new master data.

After updating the master data as above, the master device 1 transmits a message saying "Data has been updated. Please copy new master data." to all the general devices 2, 3 and 4 and supplies the new master data to the general devices 2, 3 and 4.

Further, the master device 1 successively transmits instructions (requesting each device to copy backup data stored in a higher-level device (having an immediately higher priority) into the device) to the general devices 2, 3 and 4, starting from the device 4 of the lowest priority. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1. Finally, the device 2 obtains former backup data #1 (new backup data #2) from the higher-level device (master device) 1 and stores it as new backup data #2 (by overwriting its own former backup data #2 with the obtained former backup data #1) and reports the backup completion to the master device 1.

By the above process, the update of the address book data and the storage of the backup data are completed.

Concrete Example #8 of Operation of Network System

Next, a concrete example #8 will be explained.

Figure 32:
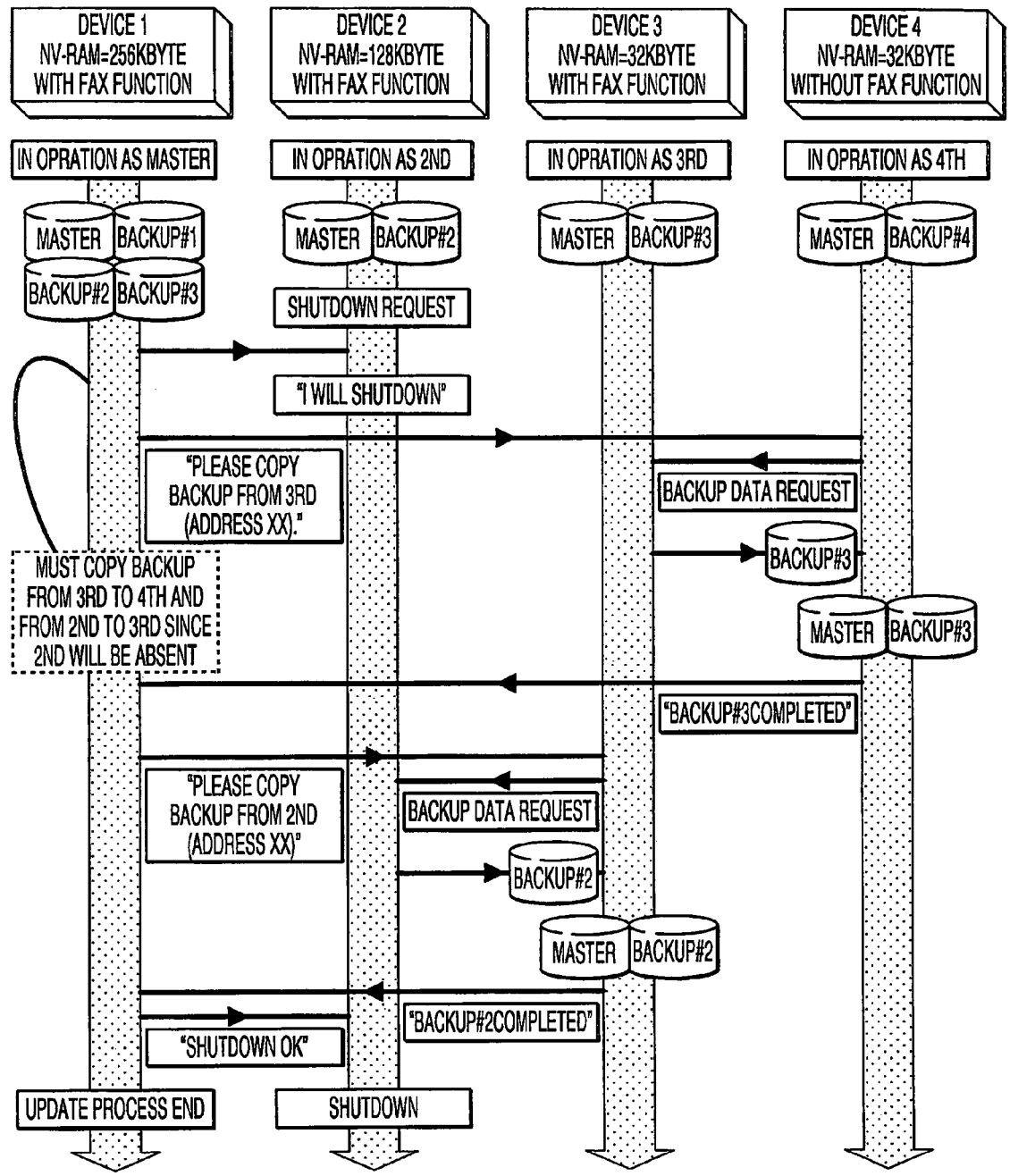
FIG. 32 is a timing chart showing a concrete example #8 of the operation of the network system in accordance with aspects of the present invention.

FIG. 32 is a timing chart showing a case where the shutdown request is transmitted from the device 2 to the device 1 when four devices 1, 2, 3 and 4 are in operation on the network.

In the concrete example #8, the master aptitude values of the devices 1, 2, 3 and 4 are 512, 256, 64 and 32, respectively.

When a request for shutdown occurs in the device 2, the device 2 transmits the shutdown request saying "I will shut down." to the master device 1. The master device 1 receiving the shutdown request recognizes that the second priority device will be absent and thus the backup data of the third priority device has to be copied to the fourth priority device and the backup data of the second priority device has to be copied to the third priority device. In this case, the master device 1 successively transmits instructions (requesting each device to copy backup data stored in a higher-level device into the device) to the general devices 4 and 3 (from the lowest priority device 4 to the device 3 having an immediately lower priority than the sender of the shutdown request) starting from the lowest priority device 4. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1.

By the above process, the backup data #3 stored in the device 3 (having an immediately higher priority than the device 4) is transferred to the device 4 and the backup data #2 stored in the device 2 (having an immediately higher priority than the device 3) is transferred to the device 3, by which the latest backup data stored in a device that is going to shut down (device 2) can be transferred to another device in operation (device 3).

Concrete Example #9 of Operation of Network System

Next, a concrete example #9 will be explained.

Figure 33:
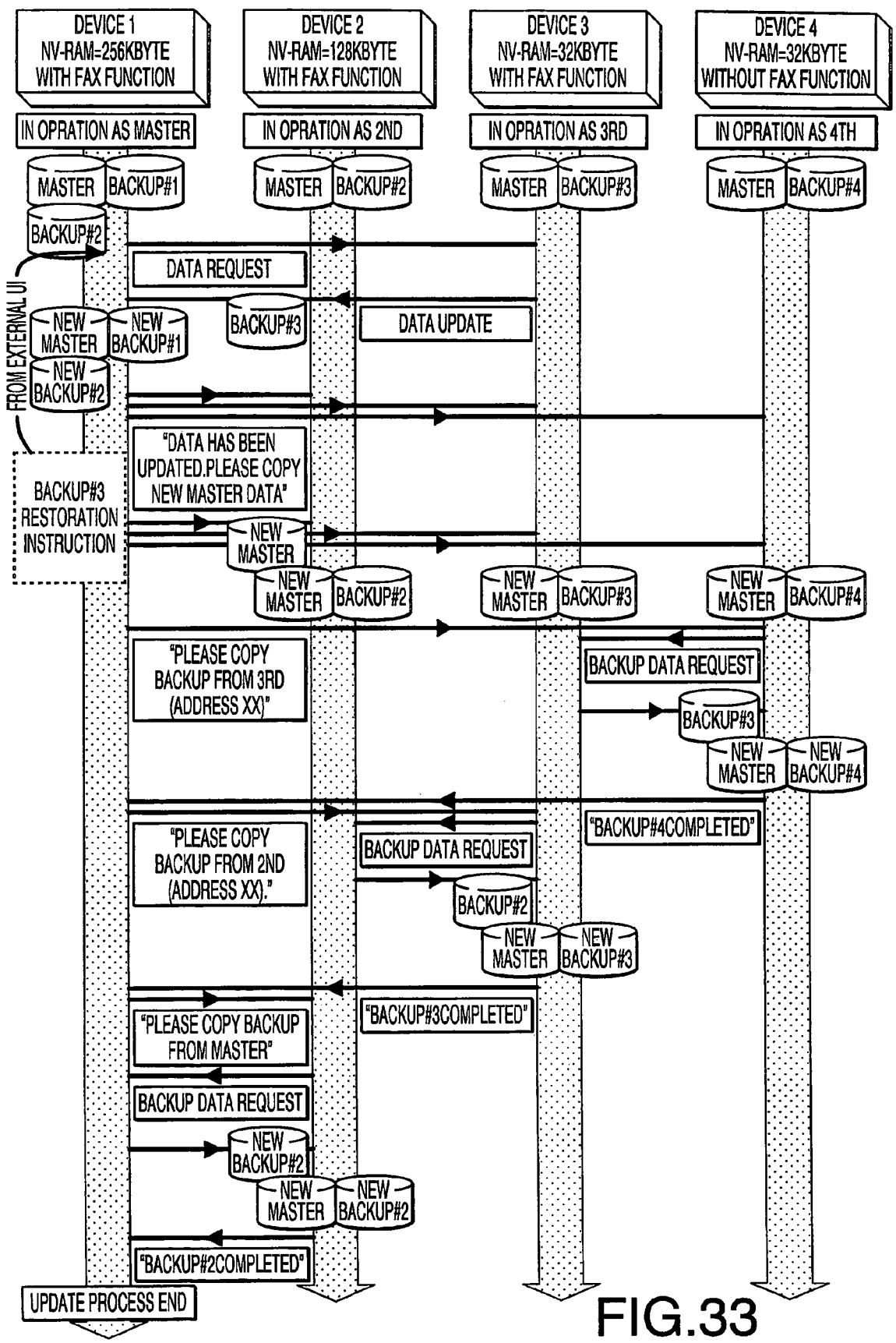
FIG. 33 is a timing chart showing a concrete example #9 of the operation of the network system in accordance with aspects of the present invention.

FIG. 33 is a timing chart showing a case where an operation for restoring the master data to the backup data #3 is performed by the user when four devices 1, 2, 3 and 4 are in operation on the network.

In the concrete example #9, the master aptitude values of the devices 1, 2, 3 and 4 are 512, 256, 64 and 32, respectively. In the example of FIG. 33, the master device 1 is capable of storing two backup data files (backup data #1 and backup data #2).

When an operation for restoring the master data to the backup data #3 is performed by the user of the PC and an instruction requesting such restoration is transmitted from the PC to the master device 1, the master device 1 not storing the backup data #3 transmits a data request (requesting the backup data #3) to the device 3 storing the backup data #3. In response to the data request, the device 3 transmits the backup data #3 to the master device 1.

The master device 1 receiving the backup data #3 deletes the oldest backup data #2, renames the former backup data #1 as (new) "backup data #2", renames the former master data as (new) "backup data #1", and regards the backup data #3 received from the device 3 as new master data.

After updating (restoring) the master data as above, the master device 1 transmits a message saying "Data has been updated. Please copy new master data." to all the general devices 2, 3 and 4 and supplies the new master data to the general devices 2, 3 and 4.

Further, the master device 1 successively transmits instructions (requesting each device to copy backup data stored in a higher-level device into the device) to the general devices 2, 3 and 4, starting from the device 4 of the lowest priority. In response to each instruction, the lowest priority device 4 first obtains former backup data #3 from the higher-level device 3 and stores it as new backup data #4 (by overwriting its own former backup data #4 with the obtained former backup data #3) and reports the backup completion to the master device 1. Subsequently, the device 3 obtains former backup data #2 from the higher-level device 2 and stores it as new backup data #3 (by overwriting its own former backup data #3 with the obtained former backup data #2) and reports the backup completion to the master device 1. Finally, the device 2 obtains former backup data #1 (new backup data #2) from the higher-level device (master device) 1 and stores it as new backup data #2 (by overwriting its own former backup data #2 with the obtained former backup data #1) and reports the backup completion to the master device 1.

By the above process, the update of the address book data (restoration of the master data) and the storage of the backup data are completed.

Concrete Example #10 of Operation of Network System

Next, a concrete example #10 will be explained.

Figure 34:
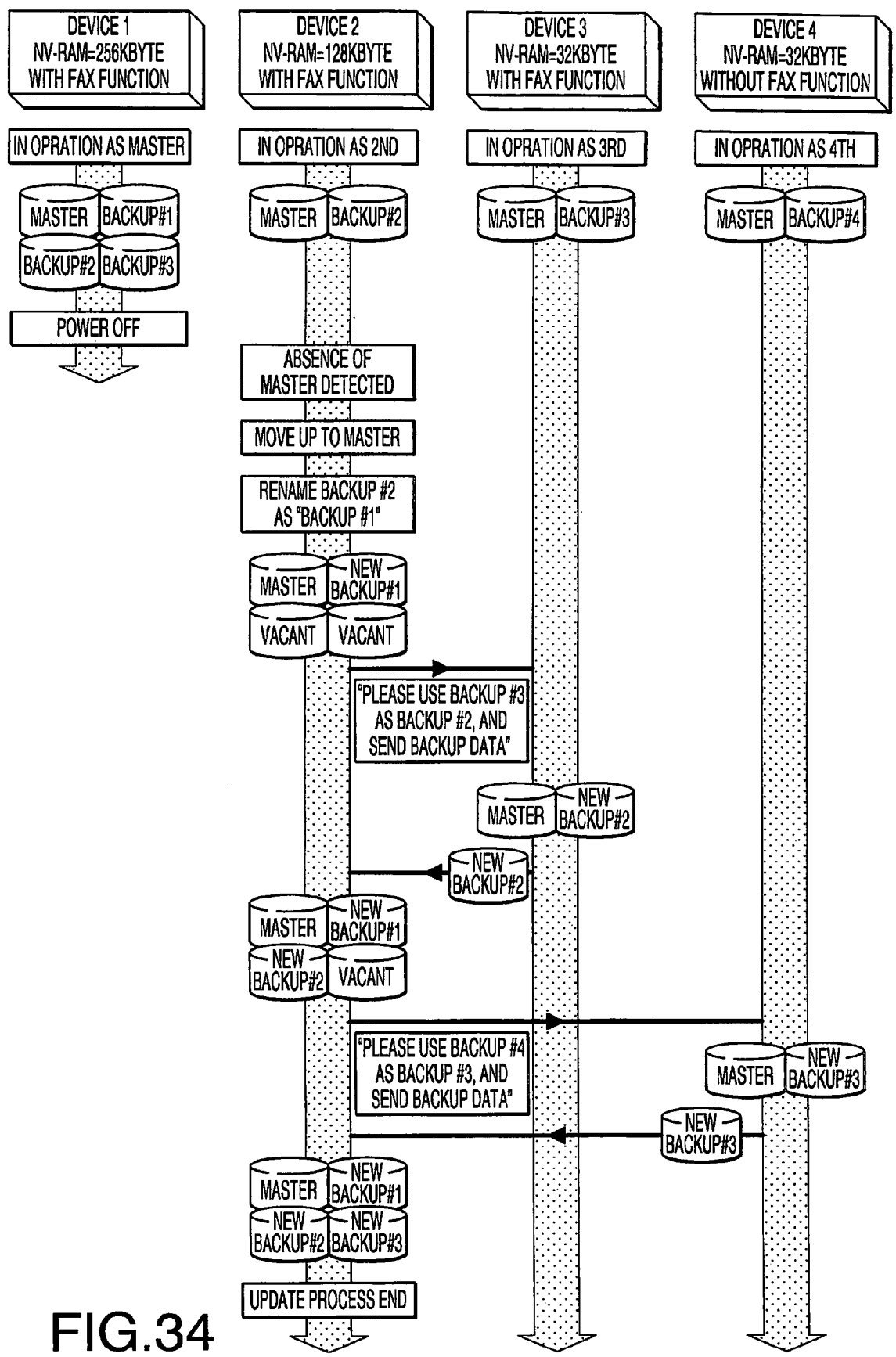
FIG. 34 is a timing chart showing a concrete example #10 of the operation of the network system in accordance with aspects of the present invention.

FIG. 34 is a timing chart showing how the backup data are transferred when the master device 1 stops its operation when four devices 1, 2, 3 and 4 are in operation on the network.

In the concrete example #10, the master aptitude values of the devices 1, 2, 3 and 4 are 512, 256, 64 and 32, respectively.

When the master device 1 stops its operation, the device 2 of the next priority detects the absence of the master device 1 and moves up to the master device. In this case, the device 2 (storing the master data and the backup data #2 therein) renames the backup data #2 as new "backup data #1". The device 2 further requests lower-level devices 3 and 4 to send back their backup data #3 and #4. When the backup data #3 and #4 are received from the devices 3 and 4, the device 2 stores the received backup data #3 and #4 as new backup data #2 and #3, respectively.

Consequently, the device 2, which had stored the master data and the backup data #2 only at the point when the master device 1 stopped its operation, can store three pieces of new backup data #1, #2 and #3 when moving up to the master device.

Concrete Example #11 of Operation of Network System

Next, a concrete example #11 will be explained.

Figure 35:
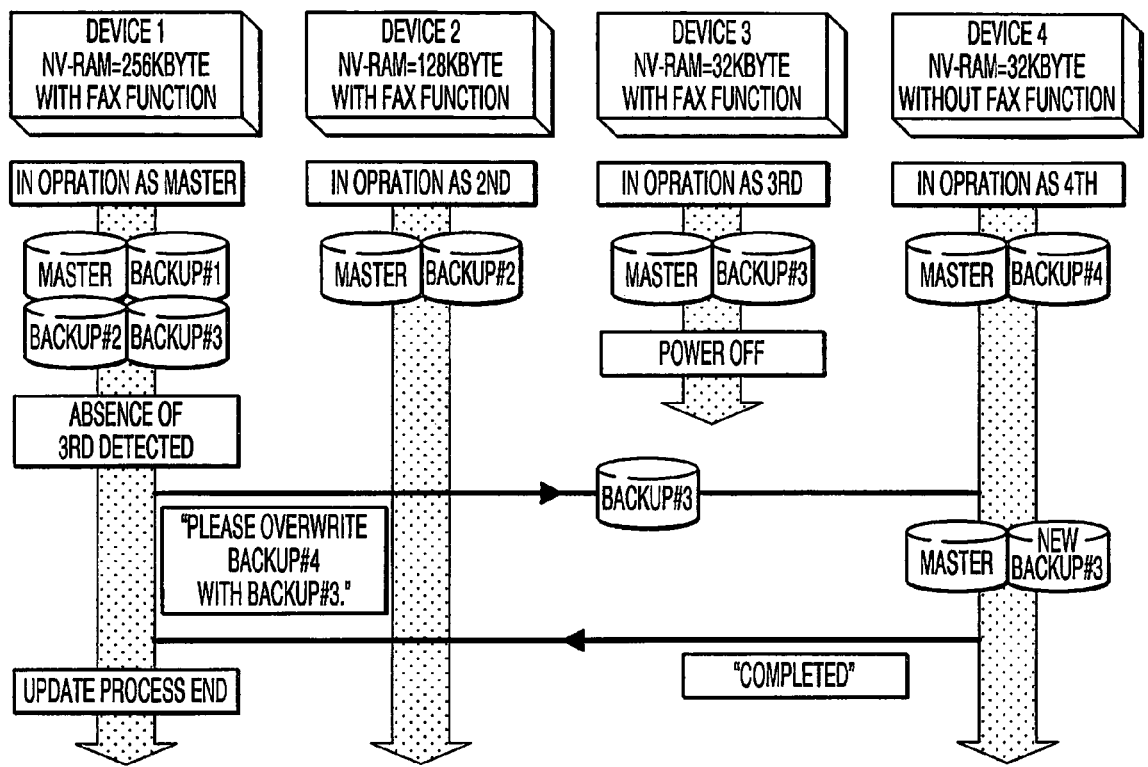
FIG. 35 is a timing chart showing a concrete example #11 of the operation of the network system in accordance with aspects of the present invention.

FIG. 35 is a timing chart showing how the backup data are transferred when the general device 3 stops its operation when four devices 1, 2, 3 and 4 are in operation on the network.

In the concrete example #11, the master aptitude values of the devices 1, 2, 3 and 4 are 512, 256, 64 and 32, respectively.

When the general device 3 stops its operation, the master device 1 detects the absence of the device 3. In this case, the master device 1 has the backup data #3 (stored in the device 3) therein and the backup data #3 is newer backup data than the backup data #4 stored in the device 4. Therefore, the master device 1 instructs the device 4 to overwrite its backup data #4 with the backup data #3 transferred from the master device 1.

The device 4 receives the backup data #3 from the master device 1, overwrites its own backup data #4 with the received backup data #3, and reports the completion of overwriting to the master device 1.

By the above process, the backup data distributed and stored in the general devices can be managed so as to realize the storage of newer backup data.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the address book data is used as the shared data supplied from the master device to the general devices in the above embodiment, the present invention is applicable to any type of shared data as long as the data is shared by a plurality of devices on a network. Specifically, the shared data may include device setting data to be set to a plurality of devices in common, the name or mail address of a manager (administrator) and condition information to be reported to the manager in cases where a plurality of devices are managed by the same manager, a mail server address and a name server address generally used in common in a network, etc. By supplying such shared data from the master device to the general devices, the troublesome task of inputting such data to each of the general devices can be eliminated.

While the master aptitude value is obtained by multiplying the nonvolatile memory capacity (nonvolatile RAM capacity) and the continuous operability index together in the above embodiment, the calculating formula of the master aptitude value may be modified arbitrarily depending on performance required of the master device. For example, it is desirable to calculate the master aptitude value using at least one of the following parameters (including those used in the above embodiment):

(a) nonvolatile RAM capacity (Kbyte) (High nonvolatile memory capacity is suitable for backup.)
(b) HDD capacity (Kbyte) (High HDD capacity is also suitable for backup.)
(c) continuous operability index (2: with the FAX function, 1: without the FAX function) (Low probability of power off is suitable for the master device.)
(d) CPU clock rate (MHz) (High processing speed is suitable for the master device.)
(e) RAM capacity (Mbyte) (High calculation speed is suitable for the master device.)
(f) network I/F bit rate (bps) (A high bit rate of the network I/F is suitable for mass data communication between devices avoiding a bottleneck caused by the network I/F.)
(g) shipping date (year) (A newer product generally has higher performance when the functions and the price range are the same.)

The above parameters (a)-(g) can be used for the calculation of the master aptitude value while properly adjusting the combination of parameters, the weight of each parameter in the formula, etc. depending on factors to be emphasized, or properly combining multiplication, addition, etc. For example, while a master aptitude value $(p)=(a)\times(c)$ is employed in the above embodiment, a formula $(p)=((a)+(b))\times(c)$ may be used when the backup data are stored also in the HDD. When the RAM capacity is taken into consideration, a formula $(p)=((a)+(e)/2)\times(c)$ or $(p)=((a)+(e)-2000)\times(c)$ may be employed, for example.

What is claimed is:

1. A network system comprising a plurality of devices connected to a network each of which is assigned an ordinal rank in the system in which a device of a highest ordinal rank functions as a master device while devices of the other ordinal ranks function as general devices and shared data to be shared by the plurality of devices is supplied from the master device to the general devices, wherein:

each of the devices includes master device units that operate when the device functions as the master device and general device units that operate when the device functions as a general device, and the master device units include:
a shared data storing unit that stores the shared data on the device operating as the master device;
a shared data updating unit that updates the shared data stored in the shared data storing unit;
a first on-update backup data supplying unit that supplies the shared data before update to a device operating as the general device with the highest ordinal rank as backup data when the shared data is updated by the shared data updating unit;
an on-restoration backup data acquiring unit that acquires the backup data from a device other than the device operating as the master device when a restoration instruction is given; and
a shared data restoring unit that restores the shared data to that before update by storing the backup data acquired by the on-restoration backup data acquiring unit in the shared data storing unit as the shared data, and the general device units include:
a backup data storing unit that stores the backup data on a selected device operating as a general device;
a backup data updating unit that updates the backup data by acquiring backup data when the backup data is supplied from a device other than the selected device and storing the acquired backup data in the backup data storing unit;
a second on-update backup data supplying unit that supplies the backup data before update to a device with the ordinal rank immediately below the ordinal rank of the selected device as backup data when the backup data is updated by the backup data updating unit; and
an on-restoration backup data supplying unit that supplies the backup data in response to a request from the device operating as the master device.

2. The network system according to claim 1, wherein:
the master device units further include a backup data acquisition instruction transmitting unit that successively transmits an instruction to devices functioning as the general devices starting from the general device having the lowest ordinal rank, the instruction requesting each device receiving the instruction to acquire the backup data from a device having an ordinal rank immediately above the device receiving the instruction, and the general device units further include:
- a backup data acquisition instruction receiving unit that receives the instruction transmitted from the backup data acquisition instruction transmitting unit of the master device; and
- a backup data requesting unit that transmits a request for the backup data to a device having an ordinal rank immediately above the device receiving the instruction when the instruction is received by the backup data acquisition instruction receiving unit, and
- the first on-update backup data supplying unit supplies the backup data in response to the request from the backup data requesting unit of a device other than the device operating as the master device; and the second on-update backup data supplying unit supplies the backup data in response to the request from the backup data requesting unit of a device other than the selected device.

3. The network system according to claim 2, wherein:
the master device units further include:
- a device increase/decrease detecting unit that detects an increase/decrease of other devices in the system; and
- an ordinal rank reassigning unit that redetermines the ordinal ranks of the plurality of devices based on characteristic information representing characteristics of the devices when an increase/decrease of the devices is detected by the device increase/decrease detecting unit, and
- the backup data acquisition instruction transmitting unit successively transmits the instruction to the general devices starting from the general device having the lowest ordinal rank when the ordinal ranks are redetermined by the ordinal rank reassigning unit.

4. The network system according to claim 3, wherein the characteristic information is information incorporating storage capacity of each device.

5. The network system according to claim 3, wherein the characteristic information is information incorporating processing power of each device.

6. The network system according to claim 3, wherein the characteristic information is information incorporating continuous operability of each device.

7. The network system according to claim 1, wherein:
the master device units further include:
- a backup data information storing unit that stores first information assigned to each piece of backup data for letting a user discriminate among multiple pieces of backup data and second information specifying a device storing each piece of backup data, while associating the first information with the second information;
- an information reporting unit that reports the first information stored in the backup data information storing unit to the user;
- a selection input unit that receives an input for selecting a piece of first information from one or more pieces of first information reported by the information reporting unit; and
- a device determining unit that determines a device that is specified by the second information associated with the first information selected through the selection input unit, and the on-restoration backup data acquiring unit requests the device determined by the device determining unit to supply the backup data and acquires the backup data supplied in response to the request when the restoration instruction is given.

8. The network system according to claim 1, wherein:
the master device units further include:
- an ordinal rank determining unit that determines the ordinal ranks of the plurality of devices based on characteristic information representing characteristics of the devices;
- a master replacement reporting unit that reports to a device having an ordinal rank higher than the master device that the higher-level device should function as the master device when the devices ranked by the ordinal rank determining unit include such a higher-level device; and
- a shared data transmitting unit that transmits the shared data to the higher-level device receiving the report from the master replacement reporting unit, and the general device units further include:
- a control unit that controls the higher-level device to let it function as the master device when the report indicating that the higher-level device itself should function as the master device is received from the present master device; and
- a shared data receiving unit that receives the shared data from the master device sending the report.

9. The network system according to claim 8, wherein the characteristic information is information incorporating storage capacity of each device.

10. The network system according to claim 8, wherein the characteristic information is information incorporating processing power of each device.

11. The network system according to claim 8, wherein the characteristic information is information incorporating continuous operability of each device.

12. The network system according to claim 1, wherein:
the master device units further include an update information acquiring unit that acquires update information on the shared data updated in a general device from the general device, and the shared data updating unit is configured to update the shared data stored in the shared data storing unit based on the update information acquired by the update information acquiring unit, and the general device units further include:
- an update input unit that receives an input for updating the shared data; and
- an update information supplying unit that generates the update information on the shared data based on the input received by the update input unit and supplies the update information to the master device.

13. The network system according to claim 12, wherein the update input unit receives an input operation by a user as the input for updating the shared data.

14. The network system according to claim 1, wherein:
the master device units further include an update input unit that receives an input for updating the shared data, and the shared data updating unit is configured to generate update information on the shared data based on the input received by the update input unit and update the shared data stored in the shared data storing unit based on the update information.

15. The network system according to claim 14, wherein the update input unit receives an input operation by a user as the input for updating the shared data.

16. The network system according to claim 1, wherein:
each of the devices is a communication device having a function of transmitting data to a destination specified by address data, and
the shared data is address book data including the address data.

17. A device which is used as a node forming a network system including a plurality of devices connected to a network each of which is assigned an ordinal rank in the system in which a device of the highest ordinal rank functions as a master device while devices of the other ordinal ranks function as general devices and shared data to be shared by the plurality of devices is supplied from the master device to the general devices, wherein:
the device comprises master device units that operate when the device functions as the master device and general device units that operate when the device functions as a general device, and
the master device units include:
a shared data storing unit that stores the shared data on the device operating as the master device;
a shared data updating unit that updates the shared data stored in the shared data storing unit;
a first on-update backup data supplying unit that supplies the shared data before update to a device operating as the general device with the highest ordinal rank as backup data when the shared data is updated by the shared data updating unit;
an on-restoration backup data acquiring unit that acquires the backup data from a device other than the device operating as the master device when a restoration instruction is given; and
a shared data restoring unit that restores the shared data to that before update by storing the backup data acquired by the on-restoration backup data acquiring unit in the shared data storing unit as the shared data, and
the general device units include:
a backup data storing unit that stores the backup data on a selected device operating as a general device;
a backup data updating unit that updates the backup data by acquiring backup data when the backup data is supplied from a device other than the selected device and storing the acquired backup data in the backup data storing unit;
a second on-update backup data supplying unit that supplies the backup data before update to a device with the ordinal rank immediately below the ordinal rank of the selected device as backup data when the backup data is updated by the backup data updating unit; and
an on-restoration backup data supplying unit that supplies the backup data in response to a request from the device operating as the master device.

18. A computer-readable medium having a computer program stored thereon, said computer program comprising computer-readable instructions that cause a device, as a node forming a network system including a plurality of devices connected to a network each of which is assigned an ordinal rank in the system in which a device of the highest ordinal rank functions as a master device while devices of the other ordinal ranks function as general devices and shared data to be shared by the plurality of devices is supplied from the master device to the general devices, to function as:
master device units that operate when a device functions as the master device; and
general device units that operate when a device functions as a general device, wherein:
the master device units include:
a shared data storing unit that stores the shared data on the device operating as the master device;
a shared data updating unit that updates the shared data stored in the shared data storing unit;
a first on-update backup data supplying unit that supplies the shared data before update to a device operating as the general device with the highest ordinal rank as backup data when the shared data is updated by the shared data updating unit;
an on-restoration backup data acquiring unit that acquires the backup data from a device other than the device operating as the master device when a restoration instruction is given; and
a shared data restoring unit that restores the shared data to that before update by storing the backup data acquired by the on-restoration backup data acquiring unit in the shared data storing unit as the shared data, and
the general device units include:
a backup data storing unit that stores the backup data on a selected device operating as a general device;
a backup data updating unit that updates the backup data by acquiring backup data when the backup data is supplied from a device other than the selected device and storing the acquired backup data in the backup data storing unit;
a second on-update backup data supplying unit that supplies the backup data before update to a device with the ordinal rank immediately below the ordinal rank of the selected device as backup data when the backup data is updated by the backup data updating unit; and
an on-restoration backup data supplying unit that supplies the backup data in response to a request from the device operating as the master device.

* * * * *

UNITED STATES PATENT AND TRADEMARK OFFICE
CERTIFICATE OF CORRECTION

| | | |
|---|---|---|
| PATENT NO. | : 7,640,314 B2 | Page 1 of 1 |
| APPLICATION NO. | : 11/359406 | |
| DATED | : December 29, 2009 | |
| INVENTOR(S) | : Atsushi Kojima | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Ninth Day of November, 2010

David J. Kappos
*Director of the United States Patent and Trademark Office*